(12) United States Patent  
Blevins et al.

(10) Patent No.: US 8,127,241 B2
(45) Date of Patent: Feb. 28, 2012

(54) PROCESS PLANT USER INTERFACE SYSTEM HAVING CUSTOMIZED PROCESS GRAPHIC DISPLAY LAYERS IN AN INTEGRATED ENVIRONMENT

(75) Inventors: Terrence L. Blevins, Round Rock, TX (US); Ken J. Beoughter, Round Rock, TX (US); J. Michael Lucas, Leicester (GB); Mark J. Nixon, Round Rock, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 341 days.

(21) Appl. No.: 10/574,824

(22) PCT Filed: May 4, 2005

(86) PCT No.: PCT/US2005/015392
§ 371 (c)(1),
(2), (4) Date: Aug. 10, 2007

(87) PCT Pub. No.: WO2005/109124
PCT Pub. Date: Nov. 17, 2005

(65) Prior Publication Data
US 2008/0066004 A1    Mar. 13, 2008

Related U.S. Application Data

(60) Provisional application No. 60/567,980, filed on May 4, 2004.

(51) Int. Cl.
*G06F 3/048* (2006.01)
(52) U.S. Cl. .......... 715/771; 715/229; 715/764
(58) Field of Classification Search .......... 715/771, 715/229, 764
See application file for complete search history.

(56) References Cited

U.S. PATENT DOCUMENTS
RE30,280 E    5/1980 Berman et al.
(Continued)

FOREIGN PATENT DOCUMENTS
CN    1130460 A    9/1996
(Continued)

OTHER PUBLICATIONS

English-language translation of Office Action for corresponding Chinese Application No. 200580014283.4, dated Mar. 28, 2008.
(Continued)

*Primary Examiner* — William Bashore
*Assistant Examiner* — Gregory A Distefano
(74) *Attorney, Agent, or Firm* — Marshall, Gerstein & Borun LLP

(57) ABSTRACT

A method useful for providing a user interface for a process plant includes displaying graphical depictions of process plant elements of the process plant via the user interface. Information is generated for a plurality of content layers of a process graphic display of the process plant elements by processing data regarding operation of the process plant. Content to be displayed via the user interface is determined from the generated information by determining which content layer of the plurality of content layer is to be displayed. In some embodiments, the determination may be made based on a user profile characteristic. The generated information may therefore support multiple views of the process plant via the user interface for a plurality of different types of users of the user interface, and may involve processing data regarding actual and simulated operation of the process plant. As a result, the method may also include determining whether the process plant is currently on-line to further determine the portion of the information to be displayed via the user interface.

20 Claims, 12 Drawing Sheets

U.S. PATENT DOCUMENTS

| | | |
|---|---|---|
| 4,244,385 A | 1/1981 | Hotine |
| 4,506,324 A | 3/1985 | Healy |
| 4,512,747 A | 4/1985 | Hitchens et al. |
| 4,628,435 A | 12/1986 | Tashiro et al. |
| 4,663,704 A | 5/1987 | Jones et al. |
| 4,736,320 A | 4/1988 | Bristol |
| 4,843,538 A | 6/1989 | Lane et al. |
| 4,885,717 A | 12/1989 | Beck et al. |
| 4,972,328 A | 11/1990 | Wu et al. |
| 4,977,529 A | 12/1990 | Gregg et al. |
| 4,985,857 A | 1/1991 | Bajpai et al. |
| 5,014,208 A | 5/1991 | Wolfson |
| 5,021,947 A | 6/1991 | Campbell et al. |
| 5,041,964 A | 8/1991 | Cole et al. |
| 5,051,898 A | 9/1991 | Wright et al. |
| 5,079,731 A | 1/1992 | Miller et al. |
| 5,092,449 A | 3/1992 | Bolin et al. |
| 5,097,412 A | 3/1992 | Orimo et al. |
| 5,119,468 A | 6/1992 | Owens |
| 5,168,441 A | 12/1992 | Onarheim et al. |
| 5,218,709 A | 6/1993 | Fijany et al. |
| 5,268,834 A | 12/1993 | Sanner et al. |
| 5,321,829 A | 6/1994 | Zifferer |
| 5,347,446 A | 9/1994 | Iino et al. |
| 5,347,466 A | 9/1994 | Nichols et al. |
| 5,361,198 A | 11/1994 | Harmon et al. |
| 5,408,412 A | 4/1995 | Hogg et al. |
| 5,408,603 A | 4/1995 | Van de Lavoir et al. |
| 5,421,017 A | 5/1995 | Scholz et al. |
| 5,428,555 A | 6/1995 | Starkey et al. |
| 5,485,600 A | 1/1996 | Joseph et al. |
| 5,485,620 A | 1/1996 | Sadre et al. |
| 5,499,333 A | 3/1996 | Doudnikoff et al. |
| 5,509,116 A | 4/1996 | Hiraga et al. |
| 5,530,643 A | 6/1996 | Hodorowski |
| 5,546,301 A | 8/1996 | Agrawal et al. |
| 5,555,385 A | 9/1996 | Osisek |
| 5,576,946 A | 11/1996 | Bender et al. |
| 5,594,858 A * | 1/1997 | Blevins .......................... 715/747 |
| 5,603,018 A | 2/1997 | Terada et al. |
| 5,611,059 A | 3/1997 | Benton et al. |
| 5,631,825 A | 5/1997 | van Weele et al. |
| 5,680,409 A | 10/1997 | Qin et al. |
| 5,706,455 A | 1/1998 | Benton et al. |
| 5,752,008 A | 5/1998 | Bowling |
| 5,768,119 A | 6/1998 | Havekost et al. |
| 5,782,330 A | 7/1998 | Mehlert et al. |
| 5,796,602 A | 8/1998 | Wellan et al. |
| 5,801,942 A | 9/1998 | Nixon et al. |
| 5,806,053 A | 9/1998 | Tresp et al. |
| 5,812,394 A | 9/1998 | Lewis et al. |
| 5,818,736 A | 10/1998 | Leibold |
| 5,821,934 A | 10/1998 | Kodosky et al. |
| 5,826,060 A | 10/1998 | Santoline et al. |
| 5,828,851 A | 10/1998 | Nicon et al. |
| 5,838,563 A | 11/1998 | Dove et al. |
| 5,841,654 A | 11/1998 | Verissimo et al. |
| 5,857,102 A | 1/1999 | McChesney et al. |
| 5,862,052 A | 1/1999 | Nixon et al. |
| 5,892,939 A | 4/1999 | Call et al. |
| 5,898,860 A | 4/1999 | Leibold |
| 5,901,313 A | 5/1999 | Wolf et al. |
| 5,903,455 A | 5/1999 | Sharpe, Jr. et al. |
| 5,909,368 A | 6/1999 | Nixon et al. |
| 5,909,916 A | 6/1999 | Foster et al. |
| 5,926,177 A | 7/1999 | Hatanaka et al. |
| 5,929,855 A | 7/1999 | Benton et al. |
| 5,940,294 A | 8/1999 | Dove |
| 5,950,006 A | 9/1999 | Crater et al. |
| 5,960,214 A | 9/1999 | Sharpe, Jr. et al. |
| 5,970,430 A | 10/1999 | Burns et al. |
| 5,980,078 A | 11/1999 | Krivoshein et al. |
| 5,995,753 A | 11/1999 | Walker |
| 5,995,916 A | 11/1999 | Nixon et al. |
| 6,003,037 A | 12/1999 | Kassabgi et al. |
| 6,023,644 A | 2/2000 | Kinsman |
| 6,028,998 A | 2/2000 | Gloudeman et al. |
| 6,032,208 A | 2/2000 | Nixon et al. |
| 6,041,171 A | 3/2000 | Blaisdell et al. |
| 6,052,130 A | 4/2000 | Bardon et al. |
| 6,078,320 A | 6/2000 | Dove et al. |
| 6,094,600 A | 7/2000 | Sharpe, Jr. et al. |
| 6,098,116 A | 8/2000 | Nixon et al. |
| 6,138,174 A | 10/2000 | Keeley |
| 6,146,143 A | 11/2000 | Huston et al. |
| 6,157,864 A | 12/2000 | Schwenke et al. |
| 6,161,051 A | 12/2000 | Hafemann et al. |
| 6,167,316 A | 12/2000 | Gloudeman et al. |
| 6,173,208 B1 | 1/2001 | Park et al. |
| 6,178,393 B1 | 1/2001 | Irvin |
| 6,192,390 B1 | 2/2001 | Berger et al. |
| 6,195,591 B1 | 2/2001 | Nixon et al. |
| 6,201,996 B1 | 3/2001 | Crater et al. |
| 6,233,586 B1 | 5/2001 | Chang et al. |
| 6,268,853 B1 | 7/2001 | Hoskins et al. |
| 6,298,454 B1 | 10/2001 | Schleiss et al. |
| 6,362,839 B1 | 3/2002 | Hamilton et al. |
| 6,385,496 B1 | 5/2002 | Irwin et al. |
| 6,396,516 B1 | 5/2002 | Beatty |
| 6,421,571 B1 * | 7/2002 | Spriggs et al. .................. 700/17 |
| 6,442,515 B1 | 8/2002 | Varma et al. |
| 6,445,963 B1 | 9/2002 | Blevins et al. |
| 6,449,624 B1 | 9/2002 | Hammack et al. |
| 6,477,435 B1 | 11/2002 | Ryan et al. |
| 6,477,527 B2 | 11/2002 | Carey et al. |
| 6,480,860 B1 | 11/2002 | Monday |
| 6,505,519 B2 | 1/2003 | Henry et al. |
| 6,510,351 B1 | 1/2003 | Blevins et al. |
| 6,515,683 B1 | 2/2003 | Wright |
| 6,522,934 B1 | 2/2003 | Irwin et al. |
| 6,535,122 B1 | 3/2003 | Bristol |
| 6,546,297 B1 | 4/2003 | Gaston et al. |
| 6,571,133 B1 | 5/2003 | Mandl et al. |
| 6,577,908 B1 | 6/2003 | Wojsznis et al. |
| 6,587,108 B1 | 7/2003 | Guerlain et al. |
| 6,591,244 B2 * | 7/2003 | Jim et al. ...................... 705/7.15 |
| 6,615,090 B1 | 9/2003 | Blevins et al. |
| 6,618,630 B1 | 9/2003 | Jundt et al. |
| 6,618,745 B2 | 9/2003 | Christensen et al. |
| 6,633,782 B1 | 10/2003 | Schleiss et al. |
| 6,646,545 B2 | 11/2003 | Bligh |
| 6,647,315 B1 | 11/2003 | Sherriff et al. |
| 6,668,257 B1 | 12/2003 | Greef et al. |
| 6,684,261 B1 | 1/2004 | Orton et al. |
| 6,684,385 B1 | 1/2004 | Bailey et al. |
| 6,687,698 B1 | 2/2004 | Nixon et al. |
| 6,691,280 B1 | 2/2004 | Dove et al. |
| 6,704,737 B1 | 3/2004 | Nixon et al. |
| 6,711,629 B1 | 3/2004 | Christensen et al. |
| 6,754,885 B1 * | 6/2004 | Dardinski et al. ............ 717/113 |
| 6,758,102 B2 | 7/2004 | Henry et al. |
| 6,760,711 B1 | 7/2004 | Gillett et al. |
| 6,788,980 B1 | 9/2004 | Johnson |
| 6,795,798 B2 | 9/2004 | Eryurek et al. |
| 6,810,337 B1 | 10/2004 | Ashcraft et al. |
| 6,826,521 B1 * | 11/2004 | Hess et al. ....................... 703/12 |
| 6,904,415 B2 | 6/2005 | Krahn et al. |
| 6,948,173 B1 | 9/2005 | Isom |
| 6,957,110 B2 | 10/2005 | Wewalaarachchi et al. |
| 6,973,508 B2 | 12/2005 | Shepard et al. |
| 6,981,424 B2 | 1/2006 | Henry et al. |
| 7,043,311 B2 | 5/2006 | Nixon et al. |
| 7,050,083 B2 | 5/2006 | Yoo et al. |
| 7,050,863 B2 | 5/2006 | Mehta et al. |
| 7,062,718 B2 | 6/2006 | Kodosky et al. |
| 7,065,476 B2 | 6/2006 | Dessureault et al. |
| 7,086,009 B2 | 8/2006 | Resnick et al. |
| 7,110,835 B2 | 9/2006 | Blevins et al. |
| 7,113,834 B2 | 9/2006 | Wojsznis et al. |
| 7,117,052 B2 | 10/2006 | Lucas et al. |
| 7,146,231 B2 | 12/2006 | Schleiss et al. |
| 7,165,226 B2 | 1/2007 | Thurner et al. |
| 7,210,039 B2 | 4/2007 | Rodgers et al. |
| 7,210,095 B1 | 4/2007 | Mor |
| 7,219,306 B2 | 5/2007 | Kodosky et al. |
| 7,234,138 B2 | 6/2007 | Crevatin |
| 7,308,473 B1 | 12/2007 | Thomas et al. |

| | | | |
|---|---|---|---|
| 7,320,005 B2 | 1/2008 | Li et al. | |
| 7,330,768 B2 | 2/2008 | Scott et al. | |
| 7,376,661 B2 | 5/2008 | Larson | |
| 7,404,476 B2 | 7/2008 | Yoshida | |
| 7,526,347 B2 | 4/2009 | Lucas et al. | |
| 7,647,126 B2 | 1/2010 | Blevins et al. | |
| 7,647,558 B2 | 1/2010 | Ucar et al. | |
| 7,680,546 B2 | 3/2010 | Gilbert et al. | |
| 7,702,409 B2 | 4/2010 | Lucas et al. | |
| 7,703,032 B2 | 4/2010 | Wells | |
| 7,707,550 B2 | 4/2010 | Resnick et al. | |
| 2001/0007984 A1 | 7/2001 | Fattah et al. | |
| 2001/0010053 A1 | 7/2001 | Ben-Shachar et al. | |
| 2001/0051949 A1 | 12/2001 | Carey et al. | |
| 2002/0004796 A1 | 1/2002 | Vange et al. | |
| 2002/0010571 A1 | 1/2002 | Daniel et al. | |
| 2002/0019672 A1 | 2/2002 | Paunonen | |
| 2002/0022894 A1 | 2/2002 | Eryurek et al. | |
| 2002/0022895 A1 | 2/2002 | Genise et al. | |
| 2002/0046290 A1 | 4/2002 | Andersson et al. | |
| 2002/0055790 A1 | 5/2002 | Havekost | |
| 2002/0059282 A1 | 5/2002 | Andersson et al. | |
| 2002/0077711 A1 | 6/2002 | Nixon et al. | |
| 2002/0123864 A1 | 9/2002 | Eryurek et al. | |
| 2002/0156872 A1 | 10/2002 | Brown | |
| 2002/0184521 A1 | 12/2002 | Lucovsky et al. | |
| 2002/0184610 A1 | 12/2002 | Chong et al. | |
| 2002/0193888 A1 | 12/2002 | Wewalaarachchi et al. | |
| 2002/0199123 A1 | 12/2002 | McIntyre et al. | |
| 2003/0005169 A1 | 1/2003 | Perks et al. | |
| 2003/0009754 A1 | 1/2003 | Rowley et al. | |
| 2003/0014500 A1 | 1/2003 | Schleiss et al. | |
| 2003/0028269 A1 | 2/2003 | Spriggs et al. | |
| 2003/0028683 A1 | 2/2003 | Yorke et al. | |
| 2003/0033037 A1 | 2/2003 | Yuen et al. | |
| 2003/0041130 A1 | 2/2003 | Harrisville-Wolff et al. | |
| 2003/0084201 A1 | 5/2003 | Edwards et al. | |
| 2003/0126136 A1 | 7/2003 | Omoigui | |
| 2003/0153988 A1 | 8/2003 | Shepard et al. | |
| 2003/0191803 A1 | 10/2003 | Chinnici et al. | |
| 2003/0200062 A1 | 10/2003 | Dessureault et al. | |
| 2003/0226009 A1 | 12/2003 | Maeda et al. | |
| 2003/0236576 A1 | 12/2003 | Resnick et al. | |
| 2003/0236577 A1 | 12/2003 | Clinton | |
| 2004/0021679 A1 | 2/2004 | Chapman et al. | |
| 2004/0036698 A1 | 2/2004 | Thurner et al. | |
| 2004/0059929 A1 | 3/2004 | Rodgers et al. | |
| 2004/0075689 A1 | 4/2004 | Schleiss et al. | |
| 2004/0075857 A1 | 4/2004 | Akiyoshi et al. | |
| 2004/0078182 A1 | 4/2004 | Nixon et al. | |
| 2004/0133487 A1 | 7/2004 | Hanagan et al. | |
| 2004/0153804 A1 | 8/2004 | Blevins et al. | |
| 2004/0162792 A1 | 8/2004 | Satou et al. | |
| 2004/0181746 A1 | 9/2004 | McLure et al. | |
| 2004/0186927 A1* | 9/2004 | Eryurek et al. | 710/12 |
| 2004/0199925 A1 | 10/2004 | Nixon et al. | |
| 2004/0205656 A1 | 10/2004 | Reulein et al. | |
| 2004/0249483 A1 | 12/2004 | Wojsznis et al. | |
| 2004/0267515 A1 | 12/2004 | McDaniel et al. | |
| 2005/0005079 A1 | 1/2005 | Boudou et al. | |
| 2005/0015439 A1 | 1/2005 | Balaji et al. | |
| 2005/0027376 A1 | 2/2005 | Lucas et al. | |
| 2005/0039034 A1 | 2/2005 | Doyle et al. | |
| 2005/0062677 A1 | 3/2005 | Nixon et al. | |
| 2005/0096872 A1 | 5/2005 | Blevins et al. | |
| 2005/0164684 A1 | 7/2005 | Chen et al. | |
| 2005/0182758 A1 | 8/2005 | Seitz et al. | |
| 2005/0197786 A1 | 9/2005 | Kataria et al. | |
| 2005/0197803 A1 | 9/2005 | Eryurek et al. | |
| 2005/0197805 A1 | 9/2005 | Eryurek et al. | |
| 2005/0197806 A1 | 9/2005 | Eryurek et al. | |
| 2005/0217971 A1 | 10/2005 | Kim | |
| 2005/0222698 A1 | 10/2005 | Eryurek et al. | |
| 2005/0277403 A1 | 12/2005 | Schmidt et al. | |
| 2006/0031354 A1 | 2/2006 | Patrick et al. | |
| 2006/0031481 A1 | 2/2006 | Patrick et al. | |
| 2006/0136555 A1 | 6/2006 | Patrick et al. | |
| 2006/0259524 A1 | 11/2006 | Horton | |
| 2007/0006149 A1 | 1/2007 | Resnick et al. | |
| 2007/0061786 A1 | 3/2007 | Zhou et al. |
| 2007/0078529 A1 | 4/2007 | Thiele et al. |
| 2007/0129917 A1 | 6/2007 | Blevins et al. |
| 2007/0156264 A1 | 7/2007 | Schleiss et al. |
| 2007/0165031 A1 | 7/2007 | Gilbert et al. |
| 2007/0170037 A1 | 7/2007 | Kuroda |
| 2007/0211079 A1 | 9/2007 | Nixon et al. |
| 2007/0244582 A1 | 10/2007 | Wolf |
| 2007/0282480 A1 | 12/2007 | Pannese et al. |
| 2008/0034367 A1 | 2/2008 | Patrick et al. |
| 2008/0116035 A1 | 5/2008 | Ogimura |
| 2008/0140760 A1 | 6/2008 | Conner et al. |
| 2010/0168874 A1 | 7/2010 | Lucas et al. |

FOREIGN PATENT DOCUMENTS

| | | |
|---|---|---|
| CN | 101833289 A | 9/2010 |
| CN | 101893861 A | 11/2010 |
| EP | 0 482 523 A2 | 4/1992 |
| EP | 0813129 | 12/1997 |
| EP | 1 030 251 A1 | 8/2000 |
| EP | 1122652 | 8/2001 |
| EP | 1 204 033 | 5/2002 |
| EP | 1 284 446 | 2/2003 |
| EP | 1 538 619 A1 | 6/2005 |
| GB | 2 083 258 A | 3/1982 |
| GB | 2 328 523 | 2/1999 |
| GB | 2 370 665 | 7/2000 |
| GB | 2 348 020 | 9/2000 |
| GB | 2349958 | 11/2000 |
| GB | 2 355 545 A | 4/2001 |
| GB | 2 371 884 | 8/2002 |
| GB | 2372365 | 8/2002 |
| GB | 2 377 045 | 12/2002 |
| GB | 2 395 801 | 6/2004 |
| GB | 2 398 659 | 8/2004 |
| GB | 2 415 809 A | 1/2006 |
| GB | 2 417 574 | 3/2006 |
| GB | 2 417 575 | 3/2006 |
| GB | 2 418 030 | 3/2006 |
| GB | 2 418 031 | 3/2006 |
| GB | 2 429 388 A | 2/2007 |
| GB | 2 446 343 A | 8/2008 |
| JP | 1-298389 | 12/1979 |
| JP | 60-075909 A | 4/1985 |
| JP | 62-223778 | 10/1987 |
| JP | 62-223778 A | 10/1987 |
| JP | 1-116706 A | 5/1989 |
| JP | 1-120593 | 5/1989 |
| JP | 01-241589 A | 9/1989 |
| JP | 1-241589 A | 9/1989 |
| JP | 2-310602 | 12/1990 |
| JP | 3-257509 | 11/1991 |
| JP | 03-257509 A | 11/1991 |
| JP | 5-54277 | 3/1993 |
| JP | 05-079858 A | 3/1993 |
| JP | 5-079858 A | 3/1993 |
| JP | 6-26093 | 2/1994 |
| JP | 6-044479 | 2/1994 |
| JP | 6-274297 | 9/1994 |
| JP | 7-036538 | 2/1995 |
| JP | 7-248941 | 9/1995 |
| JP | 8-190422 | 7/1996 |
| JP | 8-314760 | 11/1996 |
| JP | 09-500996 A | 1/1997 |
| JP | 9-500996 T | 1/1997 |
| JP | 9-134213 | 5/1997 |
| JP | 9-330013 | 12/1997 |
| JP | 10-505179 | 5/1998 |
| JP | 10-149207 A | 6/1998 |
| JP | 11-007315 A | 1/1999 |
| JP | 11-345023 | 12/1999 |
| JP | 2000-050531 | 2/2000 |
| JP | 2000-249782 A | 9/2000 |
| JP | 2000-259228 | 9/2000 |
| JP | 2000-311004 | 11/2000 |
| JP | 2000-346299 A | 12/2000 |
| JP | 2001-195121 A | 7/2001 |
| JP | 2002-108600 | 4/2002 |
| JP | 2002-140114 | 5/2002 |

| | | |
|---|---|---|
| JP | 2002-215221 A | 7/2002 |
| JP | 2002-258936 | 9/2002 |
| JP | 2002-258936 A | 9/2002 |
| JP | 2002-268737 | 9/2002 |
| JP | 2002-303564 | 10/2002 |
| JP | 2004-199655 A | 7/2004 |
| JP | 2003-34629 A | 9/2004 |
| JP | 9-288512 | 11/2007 |
| WO | WO-91/19237 A1 | 12/1991 |
| WO | WO-95/04314 | 2/1995 |
| WO | WO-97/27540 A1 | 7/1997 |
| WO | WO-97/38362 | 10/1997 |
| WO | WO-97/45778 | 12/1997 |
| WO | WO-98/53398 | 11/1998 |
| WO | WO-00/23798 | 4/2000 |
| WO | WO-00/70417 | 11/2000 |
| WO | WO-01/09690 | 2/2001 |
| WO | WO-01/65322 A1 | 9/2001 |
| WO | WO-02/071169 | 9/2002 |
| WO | WO-03/003198 | 1/2003 |
| WO | WO-03/038584 | 5/2003 |
| WO | WO-03/048922 A1 | 6/2003 |
| WO | WO-03/075206 | 9/2003 |
| WO | WO-03/075206 A2 | 9/2003 |
| WO | WO-2004/025437 A2 | 3/2004 |
| WO | WO-2004/086160 A1 | 10/2004 |
| WO | WO-2005/107409 | 11/2005 |
| WO | WO-2005/107410 | 11/2005 |
| WO | WO-2005/107416 | 11/2005 |
| WO | WO-2005/109122 | 11/2005 |
| WO | WO-2005/109123 | 11/2005 |
| WO | WO-2005/109124 | 11/2005 |
| WO | WO-2005/109125 | 11/2005 |
| WO | WO-2005/109126 | 11/2005 |
| WO | WO-2005/109127 | 11/2005 |
| WO | WO-2005/109128 | 11/2005 |
| WO | WO-2005/109129 | 11/2005 |
| WO | WO-2005/109130 | 11/2005 |
| WO | WO-2005/109131 | 11/2005 |
| WO | WO-2005/109250 | 11/2005 |
| WO | WO-2005/119381 | 12/2005 |
| WO | WO-2007/067645 | 6/2007 |

OTHER PUBLICATIONS

CAMO product datasheet, "The Unscrambler 9.6," www.camo.com.
Developers.sun.com, "Core J2EE Patterns—Data Access Object," *Core J2EE Pattern Catalog* (2004).
Retrieved from the Internet on Feb. 1, 2006: <URL: http://web.archive.org/web/20040414043406/java.sun.com/blueprints/corej2eepatterns/Patterns/DataAccessObjects.html>.
Han et al., "Web Based rSPC (realtime Statistical Process Control) System Supporting XML Protocol," *ISIE*, vol. 1, pp. 399-403 (2001).
Mehta et al., "Feedfoward Neural Networks for Process Identification and Prediction," Neural Network and Experty Systems Presentation (2001).
Mohr et al., "BizTalk and Application Integration—Translating Between Message Specification: BizTalk Mapper," *Professional BizTalk*, pp. 1-3 (2001).
StatSoft product datasheet, "Statistica, Multivariate Statistical Process Control," www.statsoft.com.
Tzovla et al., "Abnormal Condition Management Using Expert Systems," Neural Network and Expert Systems Presentation (2001).
Umetrics product datasheet, "SIMCA-P 11" and "SIMCA-P+ 11," www.umetrics.com.
W3C, "XSL Transformations (XSLT)," *W3C Recommendation*, pp. 3 (1999).
International Search Report for International Application No. PCT/US2005/015392, mailed Sep. 16, 2005.
Office Action for corresponding Chinese Application No. 200580014283.4, dated Nov. 14, 2008.
Chinese Office Action for Application No. 200580014283.4, dated Jun. 26, 2009.
Examination Report for Application No. GB0621084.3, dated Jul. 13, 2009.
Examination Report for Application No. GB0621084.3, dated Mar. 17, 2010.
Examination Report for Application No. GB0621084.3, dated Jun. 30, 2010.
Office Action for corresponding Chinese Application No. 200580014283.4, dated Dec. 21, 2010.
"Powerful Solutions for Digital Plants", Mimic Simulation v2.6, Mynah Technologies 2003, pp. 1-15.
Alsop et al., "What Dynamic Simulation Brings to a Process Control Engineer: Applied Case Study to a Propylene/Propane Splitter," URL:http://www.aspentech.com/publication_files/ertc2004_alsop_ferrer.pdf.
Arzen, "Using Real-Time Expert Systems for Control System Prototyping," *Proceedings of the International Conference on Systems, Man and Cybernetics*, 3:25-30 1993.
Bailey, "Elsag Bailey automation", approximately 1993.
Bailey, "Introducing Bailey Evolution 90TM . . . The Sound Investment Strategy for Process Automation", 1993.
Bailey, "Wide-Range, Fully Compatible Family of Process Automation and Management Systems", 1993.
Chen, "Real-Time Management in the Distributed Environment," Ph.D. Thesis (1999).
Computer Products, "Unbundling the DCS", approximately 1992.
Fisher-Rosemount Systems, Inc., DeltaV Bulk Edit, pp. 1-12 (2002).
Fisher-Rosemount, "Managing the Process Better", Dec. 1993.
Fisher-Rosemount, "Managing the Process Better", Sep. 1993.
Foldoc, "Declarative Language," Retrieved from the Internet on Jul. 30, 2007: URLhttp://ftp.sunet.se/foldoc/foldoc.cgi?declarative+language.
Honeywell "UDC 6000 Process Controller", Aug. 1992.
Honeywell, "Process Manager Specification and Technical Data", Sep. 1991.
Honeywell, "TDC 3000 Overview", approximately 1992.
Honeywell, "TDC 3000 Process Manager", approximately 1992.
Invensys Process Systems News, Invensys Introduces Enhanced Foxboro Engineering and Operations for the I/A Series Automation System, (2002): Retreived from the Internet on May 28, 2010: URL:http://www.automation.com/smc/print.php?stripImages=no.
Kopp, About.com, C++ Tutorial—Lesson 17: Classes, Members and Methods, Retrieved from the Internet on Apr. 27, 2005: URL:http://www.cplus.about.com/od/beginnerctutorial/l/aa070602a.htm.
Kopp, About.com, C++ Tutorial—Lesson 17: Classes, Members and Methods, Defining Classes, Retrieved from the Internet on Apr. 27, 2005: URL:http://www.cplus.about.com/od/beginnerctutorial/l/aa070602b.htm.
Kopp, About.com, C++ Tutorial—Lesson 17: Classes, Members and Methods, Defining Methods, Retrieved from the Internet on Apr. 27, 2005: URL:http://www.cplus.about.com/od/beginnerctutorial/l/aa070602c.htm.
Kopp, About.com, C++ Tutorial—Lesson 29: Inheritance Introduction, Retrieved from the Internet on Apr. 27, 2005: URL:http://www.cplus.about.com/od/beginnerctutorial/l/aa120502a.htm.
Kopp, About.com, C++ Tutorial—Lesson 29: Inheritance, Retrieved from the Internet on Apr. 27, 2005: URL:http://www.cplus.about.com/od/beginnerctutorial/l/aa120502b.htm.
Kopp, About.com, C++ Tutorial—Lesson 29: Inheritance, Continued, Retrieved from the Internet on Apr. 27, 2005: URL:http://www.cplus.about.com/od/beginnerctutorial/l/aa12050c.htm.
Kopp, About.com, C++ Tutorial—Lesson 9: Introduction to Classes, Defining Classes, Retrieved from the Internet on Apr. 27, 2005: URL:http://cplus.about.com/od/beginnerctutorial/l/aa041002b.htm.
MSDN Magazine, "A First Look at Writing and Deploying Apps in the Next Generation of Windows," Retrieved from the Internet on Aug. 21, 2007: URL http://msdn.microsoft.com/msdnmag/issues/04/01/DevelopingAppsforLonghorn/?print=true.
Kopp, About.com, C++ Tutorial—Lesson 9: Introduction to Classes, Using Objects, Retrieved from the Internet on Apr. 27, 2005: URL:http://www.cplus.about.com/od/beginnerctutorial/l/aa041002d.htm.
Kurpis, "The New IEEE Standard Dictionary of Electrical and Electronics Terms (Including Abstracts of All Current IEEE Standards)," Fifth Ed., Christopher J. Booth, Editor, pp. 317 (1993).
Leeds et al., "Make Your Automation Plan a Reality: MAX 1000", approximately 1990.

MSDN Magazine, "A First Look at Writing and Deploying Apps in the Next Generation of Windows," Retrieved from the Internet on Aug. 21, 2007: URL http://msdn.microsoft.com/msdnmag/issues/04/01/DevelopingAppsforLonghorn ?print=true.

MSDN Magazine, "Create Real Apps Using New Code and Markup Model," Retrieved from the Internet on Aug. 21, 2007: URL http://msdn.microsoft.com/msdnmag/issues/04/01/avalon/?print=true.

Nahavandi et al., "A Virtual Manufacturing Environment with an Element of Reality," *Advanced Factory Automation, Conf.* Pub. 398: 624-629 (1994).

Nishimura, "Ways of Considering and Promoting Informational Instrumentation Opened Up by the Web, Web Utilization Viewed in SCADA/HMI Software, Actuality of Plant Data Monitoring by Internet Compatible Add-On-Software," Instrumentation, 45(9):54-59 (1999).

Notice of Rejection for Japanese Application No. 2007-511519, dated Jan. 11, 2011.

Ohmura, "Dynamic Simulator Visual Modeler," pp. 20-27 (1998).

OPC Foundation, "What is OPC?" Retrieved from the Internet on Aug. 21, 2007: URL http://www.opcfoundation.org/Default.aspx/01_about/01_whatis.asp?MID=AboutOPC.

Podesta et al., "Virtual Instrumentation for the Management, Simulation and Control of an In House Power Plant," IEEE Instrumentation and Measurement Technology Conference, pp. 1104-1106 (1996).

PSS 21S-2B8 B4, FoxView Software, pp. 1-12 (2005).

Reliance Electric Company, "Multitasking Capability Simplifies Process Control Design", approximately late 1980s, by Angelo J. Notte.

Sugitani, "Package Software and Applications for Constructing Job Sites and Control Systems 3, SCADA Software FactoryLink 7", Automation, 45(10):18-23 (2000).

Sztipanovits et al. "Modeling, Model, Interpretation and Intelligent Control" Proc. of the Third IEEE International Symposium on Intelligent Control, pp. 46-50 (1989).

Toshiba, "Toshiba Integrated Control Systems", Nov. 1990.

Wikipedia, "Application Programming Interface," Retrieved from the Internet on Aug. 21, 2007: URL http://en.wikipedia.org/wiki/Application_programming_interface.

Wikipedia, "Extensible Application Markup Language," Retrieved from the Internet on Jul. 30, 2007: URL http://en.wikipedia.org/wiki/Extensible_Application_Markup_Language.

Wikipedia, "Vector Graphics," Retrieved from the Internet on Aug. 21, 2007: URL http://en.wikipedia.org/wiki/Vector_graphics.

Yang, "Design Issues and Implementation of Internet-Based Process Control System," *Control Engineering Practice*, pp. 709-720 (2001).

Office Action for corresponding Japanese Application No. 2007-511519, dated Sep. 27, 2011.

Sugitani, Kazushi, "Package Software and Applications for Job Site/Control System Construction 3, SCADA Software, 'FactoryLink 7'", *Automation*, Nikkan Kogyo Publishing Productions, Oct. 1, 2000, vol. 45, No. 10, pp. 18-23.

Nishimura, Hideaki, "Informatization Instrumentation Pioneered by the Web: Thought and Promotion Thereof; Web Utilization Seen in SCADA/HMI Software; Reality of Plant Data Monitoring by Internet-Compatible Add-On Software", *Instrumentation* (*Keiso*), Kogyogijutsusha, Ltd., Sep. 1, 1999, vol. 42, No. 9, pp. 54-59.

* cited by examiner

PROCESS PLANT USER INTERFACE SYSTEM HAVING CUSTOMIZED PROCESS GRAPHIC DISPLAY LAYERS IN AN INTEGRATED ENVIRONMENT

RELATED APPLICATIONS

This application is a regular filed application of, and claims, for the purposes of priority, the benefit of U.S. Provisional Application Ser. No. 60/567,980, entitled "Graphical User Interface for Representing, Monitoring, and Interacting with Process Control Systems," which was filed on May 4, 2004, and which this application hereby expressly incorporates by reference herein in its entirety. This application is also related to U.S. patent application Ser. No. 10/625,481, entitled "Integration of Graphic Display Elements, Process Modules and Control Modules in Process Plants," which was filed on Jul. 21, 2003, and which published as U.S. Publication No. 2004/0153804 on Aug. 5, 2004, which, in turn, is a Continuation-in-Part of U.S. patent application Ser. No. 10/278,469, entitled "Smart Process Modules and Objects in Process Plants," which was filed on Oct. 22, 2002, and which published as U.S. Publication No. 2004/0075689 on Apr. 22, 2004, the entire disclosures of which are hereby expressly incorporated by reference herein in their entirety. This application is also related to U.S. patent application Ser. No. 10/368,151 entitled "Module Class Objects in a Process Plant Configuration System," which was filed on Feb. 18, 2003, and which published as U.S. Publication No. 2004/0199925 on Oct. 7, 2004, the entire disclosure of which is hereby expressly incorporated by reference herein in its entirety. This application is also related to the following patent applications, which are being filed as International (PCT) applications on the same date as this application and which this application hereby expressly incorporates by reference herein in their entirety: "Associated Graphic Displays in a Process Environment" Ser. No. 10/589,712; "User Configurable Alarms and Alarm Trending for Process Control Systems" Ser. No. 10/574,570; "Integration of Process Modules and Expert Systems in Process Plants" Ser. No. 10/590,573; "Scripted Graphics in a Process Environment" Ser. No. 10/589,845; "Graphics Integration into a Process Configuration and Control Environment" Ser. No. 10/591,804; "Graphic Element with Multiple Visualizations in a Process Environment" Ser. No. 10/590,574; "System for Configuring Graphic Display Elements and Process Modules in Process Plants" Ser. No. 10/575,022; "Graphic Display Configuration Framework for Unified Process Control System Interface" Ser. No. 10/575,173; "Markup Language-Based, Dynamic Process Graphics in a Process Plant User Interface" Ser. No. 10/590,550; "Methods and Apparatus for Modifying Process Control Data" PCT/US05/15596 and Ser. No. 11/556,612; "Methods and Apparatus for Accessing Process Control Data" PCT/US05/15585 and Ser. No. 11/556,445; "Integrated Graphical Runtime Interface for Process Control Systems" PCT/US05/15439 and Ser. No. 11/556,347; "Service-Oriented Architecture for Process Control Systems" PCT/US05/15394 and Ser. No. 11/556,554.

TECHNICAL FIELD

The present invention relates generally to process plant user interfaces and, more particularly, to an intelligent control and simulation environment that enables user viewing, simulation and control to be integrated at the system level of the process plant control architecture.

DESCRIPTION OF THE RELATED ART

Distributed process control systems, like those used in chemical, petroleum or other processes, typically include one or more process controllers communicatively coupled to one or more field devices via analog, digital or combined analog/digital buses. The field devices, which may be, for example, valves, valve positioners, switches and transmitters (e.g., temperature, pressure, level and flow rate sensors), are located within the process environment and perform process functions such as opening or closing valves, measuring process parameters, etc. Smart field devices, such as the field devices conforming to the well-known Fieldbus protocol, may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART and Fieldbus field devices. The control modules in the controller send the control signals over the communication lines to the field devices to thereby control the operation of the process.

Information from the field devices and the controller is usually made available over a data highway to one or more other hardware devices, such as operator workstations, personal computers, data historians, report generators, centralized databases, etc., typically placed in control rooms or other locations away from the harsher plant environment. These hardware devices run applications that may, for example, enable an operator to perform functions with respect to the process, such as changing settings of the process control routine, modifying the operation of the control modules within the controller or the field devices, viewing the current state of the process, viewing alarms generated by field devices and controllers, simulating the operation of the process for the purpose of training personnel or testing the process control software, keeping and updating a configuration database, etc.

As an example, the DeltaV™ control system, sold by Emerson Process Management includes multiple applications stored within and executed by different devices located at diverse places within a process plant. A configuration application, which resides in one or more operator workstations, enables users to create or change process control modules and download these process control modules via a data highway to dedicated distributed controllers. Typically, these control modules are made up of communicatively interconnected function blocks, which are objects in an object oriented programming protocol, which perform functions within the control scheme based on inputs thereto and which provide outputs to other function blocks within the control scheme. The configuration application may also allow a designer to create or change operator interfaces which are used by a viewing application to display data to an operator and to enable the operator to change settings, such as set points, within the process control routine. Each dedicated controller and, in some cases, field devices, stores and executes a controller application that runs the control modules assigned and downloaded thereto to implement actual process control functionality. The viewing applications, which may be run on one or more operator workstations, receive data from the controller application via the data highway and display this data to process control system designers, operators, or users using the user interfaces, and may provide any of a number of different views of the process control routine or module, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

As the number and type of control and support applications used in a process control environment have increased, different graphical display applications have been provided to enable users to effectively configure and use these applications. For example, graphical display applications have been used to support control configuration applications to enable a configuration engineer to graphically create control programs to be downloaded to the control devices within a process plant. Additionally, graphical display applications have been used to enable control operators to view the current functioning of the process plant, or areas of the process plant, to enable maintenance personnel to view the state of hardware devices within the process plant, to enable simulation of the process plant, etc. However, these graphical display applications have, in the past, been separately created as part of, or to independently support the specific applications with which they are associated, and thus are generally limited in usefulness to the specific process function for which they were created. For example, it is difficult, if not impossible, to use a graphical program created to support a control operator in a context involving maintenance, configuration, or simulation functions.

As a particular example, some process control configuration applications presently include a library of template objects, such as function block template objects and, in some cases, control module template objects, which are used to create a control strategy for a process plant. The template objects have default properties, settings and methods associated therewith and the engineer using a graphical configuration application can select these template objects and essentially place copies of the selected template objects into a configuration screen to develop a control module. During the process of selecting and placing the template objects into the configuration screen, the engineer interconnects the inputs and outputs of these objects and changes their parameters, names, tags and other properties to create a specific control module for a specific use in the process plant. After creating one or more such control modules, the engineer can then instantiate the control module and download it to the appropriate controller or controllers and field devices for execution during operation of the process plant.

Thereafter, the engineer may use a different graphical display creation application to create one or more separate, independent displays for operator, maintenance and other personnel within the process plant by selecting and building display objects in the display creation application. These displays are typically implemented on a system wide basis in one or more of the workstations, which provide the preconfigured displays to the operator or maintenance persons regarding the operating state of the control system or the devices within the plant. These displays generally take the form of alarming displays that receive and display alarms generated by controllers or devices within the process plant, control displays indicating the operating state of the controllers and other devices within the process plant, maintenance displays indicating the functioning state of the devices within the process plant, etc. However, these displays are generally preconfigured to display, in known manners, information or data received from the process control modules or the devices within the process plant. In some known systems, displays are created through the use of objects that have a graphic associated with a physical or logical element and that is communicatively tied to the physical or logical element to receive data about the physical or logical element. The object may change the graphic on the display screen based on the received data to illustrate, for example, that a tank is half full, to illustrate the flow measured by a flow sensor, etc. However, these graphical displays used for configuration, operator control, maintenance and simulation activities are generally created separately from one another using different graphical editors.

Thus, while graphic displays have been provided in and associated with different applications used for different general activities performed within a process plant, these graphic displays and associated graphic display editors were generally added on at the functional level of the application for which they were created to support. As a result, the graphical editors, to the extent they existed, have only enabled the user to create graphics that support specific functionality needed by a specific application. Previous process plants did not provide a graphical display editor that could be used by or that could support the graphical needs of various or multiple activities being performed in the context of plant configuration and support. Thus, for example, a graphical display editor used to support or enable control configuration activities only enabled the user to create control programs and did not support the needs or functionality of operator or maintenance displays. Similarly, graphic display editors used for creating operator or maintenance views to be provided to a control operator or maintenance technician during operation of a plant, did not support functionality associated with configuration activities, simulation activities, etc. As a result of the graphic display needs being supported at the individual functional levels of the process plant, such as at the control configuration, maintenance support, control operator support and simulation support functional levels, different ones of the displays created by these various editors end up modeling and depicting the same components within the plant, which results in the duplication of graphical display efforts by various different personnel with the process plant. This duplication of effort is manifested not only in the effort needed to create the different graphical displays depicting the same process element for different uses, but also in the effort needed to tie the graphical elements used in different display applications to the actual hardware or software elements within the process plant to which they are associated.

Because graphical support for various process plant activities has been provided after the fact, and as part of the actual activity being performed, graphical support is not integrated in the plant environment in a manner that enables common graphics to be created and used within the plant at the various different functional levels of the plant. This non-integration of graphics leads to the graphics actually created for the different functions being different from function to function or from application to application, which can lead to confusion on the part of users who, while familiar with one specific type of graphical display, might occasionally need to view different displays associated with different operations or functions within the plant. Likewise, as noted above, the provision of graphical display support at the various different functional levels of the plant leads to the duplication of graphic support, both in creating displays and properly connecting the elements within the displays to actual hardware or software elements within the plant.

SUMMARY

In accordance with one aspect of the disclosure, a method of providing a user interface for a process plant includes generating information for a plurality of content layers of a process graphic display of process plant elements of the process plant, determining a content layer of the plurality of content layers to display, and displaying via the user interface the determined content layer.

In some cases, the generating step includes processing runtime data received from the process plant in connection with the process plant elements. The determining step may include selecting the determined content layer based on a user profile characteristic. When the user profile characteristic includes an indication for operator access, the displaying step may then include rendering an operator content layer of the plurality of content layers based on the runtime data.

The generating step may also or alternatively include processing simulation data in connection with simulated operation of the process plant elements. When the user profile characteristic includes an indication for maintenance access, the displaying step may then include rendering a maintenance content layer of the plurality of content layers based on the simulation data.

In some embodiments, the method further includes introducing simulated disturbances into the simulated operation of the process plant elements. In such cases, the displaying step may include rendering an instructor content layer of the plurality of content layers to support the introducing step when the user profile characteristic includes an indication for training instructor access.

More generally, the generating step may include implementing object methods defined in a plurality of objects respectively modeling the process plant elements depicted in the process graphic display. Each object of the plurality of objects may further define a graphical depiction of the process plant element for each content layer of the plurality of content layers.

In accordance with another aspect of the disclosure, disclosed is a user interface system for a process plant. The user interface system includes a computer-readable medium, a display device, and an object having information stored in the computer-readable medium regarding operation of a process plant element of the process plant. An execution engine of the user interface system utilizes the object information in a runtime environment to generate a content for a plurality of content layers of a process graphic display. The display device then depicts a specified content layer of the plurality of content layers.

The object information may related to receiving runtime data from the process plant in connection with on-line operation of the process plant element. In cases where the user profile characteristic includes an indication for operator access, the specified content layer may be directed to a customized depiction of the runtime data in an operator content layer of the plurality of content layers. Alternatively, or in addition, the object information relates to generating simulation data in connection with simulated operation of the process plant element. In cases where the user profile characteristic includes an indication for maintenance access, the specified content layer may be directed to a customized depiction of the simulation data in a maintenance content layer of the plurality of content layers. Furthermore, the object may also include information related to a simulated disturbance of the simulated operation of the process plant element. In cases where the user profile characteristic includes an indication for training instructor access, the specified content layer may be directed to a customized depiction of the simulation data arising from the simulated disturbance in an instructor content layer of the plurality of content layers.

In accordance with yet another aspect of the disclosure, a method of providing a user interface for a process plant is disclosed. The method includes generating information for a plurality of different types of users of the user interface by processing data regarding on-line and simulated operation of the process plant, and rendering a selected portion of the content in a customized depiction of the process plant by determining the selected portion of the content in accordance with a current user type of the plurality of different user types.

In some embodiments, the customized depiction is rendered by determining whether the process plant is on-line to further determine the selected portion of the content for the customized depiction.

In accordance with a still further aspect of the disclosure, disclosed is a method of generating a user interface for a process plant. The method includes creating a process graphic display of a plurality of graphic display elements representative of a plurality of process plant elements of the process plant, respectively. The plurality of graphic display elements are configured by defining parameters related to operation of the corresponding process plant elements and by defining simulation parameters to support simulated operation of the corresponding process plant elements. The method also includes establishing a plurality of content layers for selectively displaying information related to the operation and simulated operation of the process plant elements via customized views of the process graphic display.

In some embodiments, the method further includes the step of storing a plurality of objects for the plurality of graphic display elements, respectively. Each object may then include the respective parameters related to on-line operation and the simulation parameters.

DESCRIPTION OF THE PREFERRED EMBODIMENTS

Disclosed is a user interface method and system for a process plant. The user interface solution disclosed herein generally includes displaying a customized graphical depiction of process plant elements of the process plant via a display device of the user interface, where information for potential display with the graphical depiction is generated by processing data regarding both on-line and simulated operation of the process plant. The customized nature of the graphical depiction is provided by determining or specifying a content layer of the generated information. The content layer may be determined by, or specified via, a selection based on a user profile characteristic of the current user viewing the display device of the user interface.

A plurality of content layers of a process graphic display are available to support a number of different user types. Examples of user types include operators, maintenance personnel, training instructors, engineering personnel, and management. In this way, an operator may view a customized content layer of the process graphic display that presents runtime data received from the process plant in connection with the process plant elements depicted. Simulation data may also be presented in connection with a model of the process plant elements such that maintenance personnel may view a customized content layer depicting the simulation data. A simulated disturbance may also be introduced into the model of the process plant elements by a training instructor having access to an instructor content layer of the process graphic display.

The use of a plurality of content layers of a process graphic display provides an integrated approach to process plant user interfaces that avoids requiring configuration engineers and designers to create separate displays for the various personnel monitoring the process plant from different on-line and off-line perspectives. As described below, the runtime and simulation information to support the plurality of content layers is generated in an integrated manner via smart process objects that specify routines, instructions, behaviors or methods for implementation by an execution engine. The rendering of graphic display elements in a customized content layer may then involve a selection of a portion of the information generated in accordance with the methods, behaviors, etc. defined by the smart process objects. Examples of how portions of such information may be included in, or excluded from, specific content layers are presented below in connection with a number of different user profile characteristics.

Figure 1:
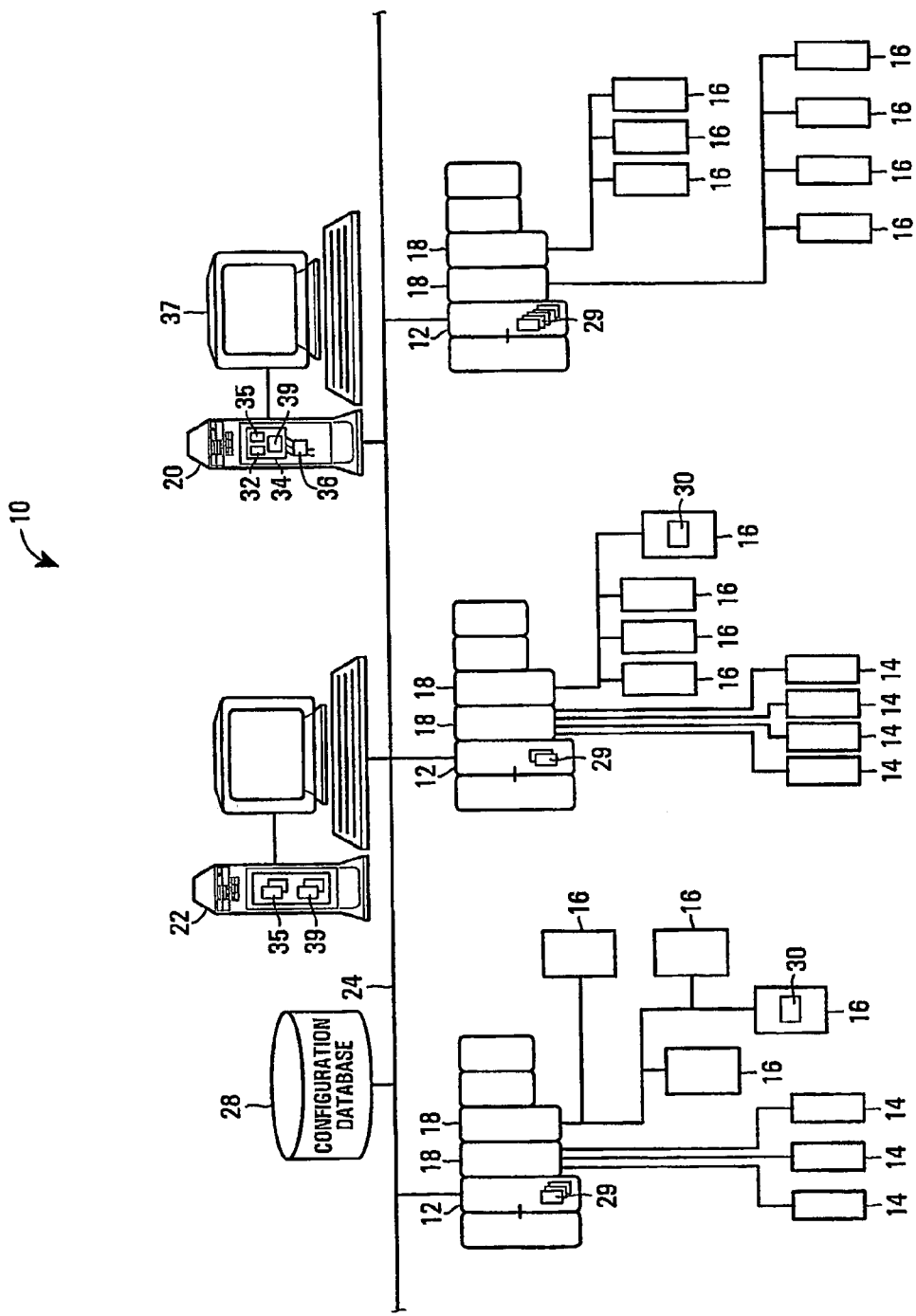
FIG. 1 is a block diagram of a distributed process control network located within a process plant including an operator workstation that implements a display routine which uses smart process objects to create process modules and graphic displays to simulate the operation of the process plant.

Referring now to FIG. 1, an example process plant 10 in which smart process objects are used to form process graphic displays and process modules, both of which may be integrated with control modules to provide enhanced control and simulation within the plant environment, is illustrated in detail. In particular, the process plant 10 uses a distributed process control system having one or more controllers 12, each connected to one or more field devices 14 and 16 via input/output (I/O) devices or cards 18 which may be, for example, Fieldbus interfaces, Profibus interfaces, HART interfaces, standard 4-20 ma interfaces, etc. The controllers 12 are also coupled to one or more host or operator workstations 20 and 22 via a data highway 24 which may be, for example, an Ethernet link. A database 28 may be connected to the data highway 24 and operates as a data historian that collects and stores parameter, status and other data associated with the controllers and field devices within the plant 10 and/or as a configuration database that stores the current configuration of the process control system within the plant 10 as downloaded to and stored within the controllers 12 and field devices 14 and 16. While the controllers 12, I/O cards 18 and field devices 14 and 16 are typically located down within and distributed throughout the sometimes harsh plant environment, the operator workstations 20 and 22 and the database 28 are usually located in control rooms or other less harsh environments easily assessable by controller or maintenance personnel.

As is known, each of the controllers 12, which may be by way of example, the DeltaV™ controller sold by Emerson Process Management, stores and executes a controller application that implements a control strategy using any number of different, independently executed, control modules or blocks 29. Each of the control modules 29 can be made up of what are commonly referred to as function blocks wherein each function block is a part or a subroutine of an overall control routine and operates in conjunction with other function blocks (via communications called links) to implement process control loops within the process plant 10. As is well known, function blocks, which may be objects in an object oriented programming protocol, typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process plant 10. Of course hybrid and other types of complex function blocks exist such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function block, ladder logic, etc. and are not limited to being designed and implemented using the function block or any other particular programming technique.

In the plant 10 illustrated in FIG. 1, the field devices 14 and 16 connected to the controllers 12 may be standard 4-20 ma devices, may be smart field devices, such as HART, Profibus, or FOUNDATION™ Fieldbus field devices, which include a processor and a memory, or may be any other desired type of device. Some of these devices, such as Fieldbus field devices (labeled with reference number 16 in FIG. 1), may store and execute modules, or sub-modules, such as function blocks, associated with the control strategy implemented in the controllers 12. Function blocks 30, which are illustrated in FIG. 1 as being disposed in two different ones of the Fieldbus field devices 16, may be executed in conjunction with the execution of the control modules 29 within the controllers 12 to implement process control, as is well known. Of course, the field devices 14 and 16 may be any types of devices, such as sensors, valves, transmitters, positioners, etc. and the I/O devices 18 may be any types of I/O devices conforming to any desired communication or controller protocol such as HART, Fieldbus, Profibus, etc.

In the process plant 10 of FIG. 1, the workstation 20 includes a suite of operator interface applications and other data structures 32 which can be accessed by any authorized user (sometimes referred to herein as a configuration engineer and sometimes as an operator, although other types of users may exist as described herein below in connection with display layers customized for user type) to view and provide functionality with respect to devices, units, etc. connected within the process plant 10. The suite of operator interface applications 32 is stored in a memory 34 of the workstation 20 and each of the applications or entities within the suite of applications 32 is adapted to be executed on a processor 36 associated with the workstation 20. While the entire suite of applications 32 is illustrated as being stored in the workstation 20, some of these applications or other entities could be stored in and executed in other workstations or computer devices within or associated with the plant 10. Furthermore, the suite of applications can provide display outputs to a display screen 37 associated with the workstation 20 or any other desired display screen or display device, including hand-held devices, laptops, other workstations, printers, etc. Likewise, the applications within the suite of applications 32 may be broken up and executed on two or more computers or machines and may be configured to operate in conjunction with one another.

Generally speaking, the suite of applications 32 provides for or enables the creation and use of three different types of entities, the operation of which may be integrated together to provide for enhanced control, simulation, and display functions within the process plant 10. More particularly, the suite of applications 32 may be used to create and implement process graphic displays 35 (which generally provide an operator display pertaining to a portion of the process plant), process modules 39 (which generally provide a simulation of a portion of a process plant) and process control modules, such as the control modules 29, which generally provide or perform on-line control of the process. The process control modules 29 are generally well known in the art and may include any type of control module, such as function block control modules, etc. The process graphic display elements 35, which will be described in more detail below, are generally elements that are used by an operator, engineer or other displays to provide information to a user, such as an operator, about the operation, configuration or set-up of the process plant and the elements therein. The process modules 39 are generally closely tied to the process graphic display elements 35 and may be used to perform simulations of the operation of the process plant or of some of the different elements therein connected in the manner depicted in the process graphic displays 35. The process graphic displays 35 and process modules 39 are illustrated as being stored in and executed by the workstations 20 and 22, although the process graphic displays 35 and the process modules 39 could be downloaded to and executed in any other computer associated with the process control plant 10, including laptops, handheld devices, etc.

Figure 2:
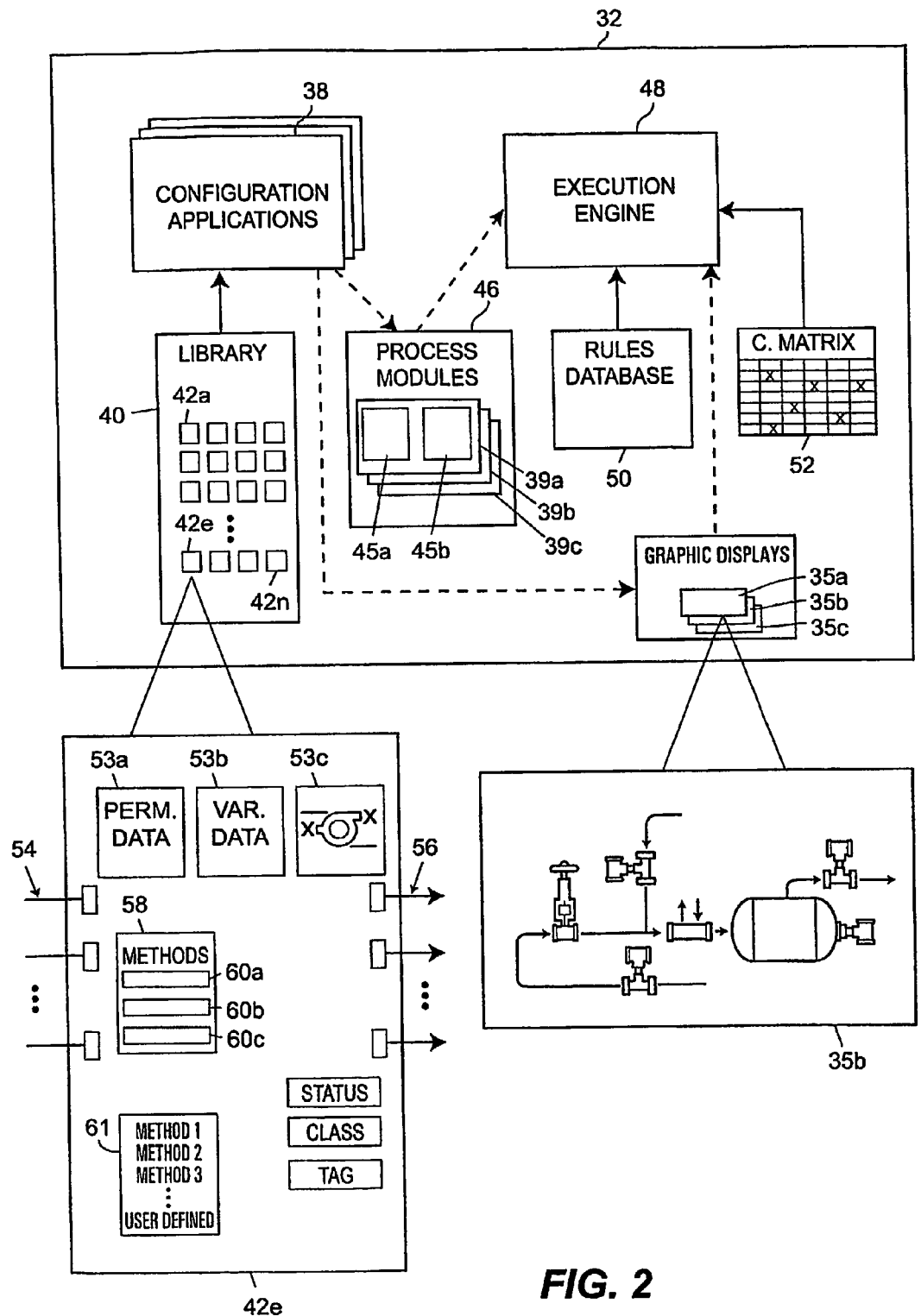
FIG. 2 is a logical block diagram of a set of applications and other entities, including smart process objects and process modules, stored in the operator workstation of FIG. 1, which may be used to implement enhanced functionality in a process plant.

FIG. 2 illustrates some of the applications and data structures or other entities within the suite of applications 32 of the workstation 20. In particular, the suite of applications 32 includes control module, process module, and graphic display configuration applications 38 which are used by a configuration engineer to create control modules, process modules (also called process flow modules) and the associated graphic displays. While the control module configuration application 38 may be any standard or known control module configuration application, the process module and graphic display configuration application(s) may create process modules and graphic displays using one or more smart process objects, the nature of which will be described in more detail below. Still further, while the process module and process graphic configuration applications 38 are shown separately, one configuration application could create both of these types of elements.

A library 40 of smart process objects 42 includes example or template smart process objects 42 that may be accessed, copied and used by the configuration application 38 to create process modules 39 and graphic displays 35. As will be understood, the configuration application 38 may be used to create one or more process modules 39, each of which is made up of or created from one or more smart process objects 42 and may include one or more process flow or simulation algorithms 45, which are stored in a process module memory 46. Additionally, the configuration application 38 may be used to create one or more graphic displays 35, each of which is made up of or created from one or more smart process objects 42 and may include any number of display elements connected together. One of the graphic displays 35b is illustrated in FIG. 2 in expanded form and includes a depiction of a set of process elements, such as valves, tanks, sensors and flow transmitters, interconnected by connection elements which may be pipes, conduit, power cables, conveyors, etc.

An execution engine 48 operates or implements each of the graphic displays 35 and the process modules 39 during runtime to create one or more process displays for an operator as defined by the graphic displays 35 and to implement simulation functionality associated with the process modules 39. The execution engine 48 may use a rules database 50 defining the logic to be implemented on the process modules 39 as a whole and the smart process objects within those modules in particular. The execution engine 48 may also use a connection matrix 52 which defines the connections between the process elements within the plant 10 as well as within the process modules 39 to implement the functionality for the process modules 39.

FIG. 2 illustrates one of the smart process objects 42e in more detail. While the smart process object 42e is illustrated as being one of the template smart process objects, it will be understood that other smart process objects will generally include the same or similar elements, features, parameters, etc. as described with respect to the smart process object 42e and that the specifics or values of these elements, features and parameters may be changed or varied from smart process object to smart process object depending on the nature and use of that smart process object. Furthermore, while the smart process object 42e may be an object within an object oriented programming environment and thus include data stores, inputs and outputs and methods associated therewith, this smart process object may be created by and implemented within any other desired programming paradigm or protocol.

As will be understood, the smart process object 42e, before being instantiated, is an object that is associated with a particular type of entity, such as a physical or a logical entity, within the process plant 10 of FIG. 1. However, after being copied and instantiated, the smart process object 42e may be tied to a particular entity within the process plant. In any event, the smart process object 42e includes a data store 53 that is used to store data received from or pertaining to the logical entity with which the smart process object 42e is associated. The data store 53 generally includes a data store 53a that stores general or permanent information about the entity to which the smart process object 42e pertains, like manufacturer, revision, name, type, etc. A data store 53b may store variable or changing data, such as parameter data, status data, input and output data, cost or other data about the entity to which the smart process object 42e pertains including data associated with the entity as it has existed in the past or as it now exists within the process plant 10. Of course, the smart process object 42e may be configured or programmed to receive this data (e.g., cost data) on a periodic or non-periodic basis, from the entity itself via any desired communication link, from the historian 28 via the Ethernet bus 24 or in any other desired manner. A data store 53c may store a graphical representation of the entity to which the smart process object 42e pertains and which is used for actual display to the operator via an operator interface, such as the screen 37 associated with the workstation 20 of FIG. 1. Of course, the graphical representation may include place holders (marked by underlines within the data store 53c) for information about the entity, such as information defined by the parameter or other variable data about the entity as stored in the data store 53b. This parameter data may be displayed in the graphical place holders when the graphical representation is presented to the operator on a display device 37 as part of one of the graphic displays 35. The graphical representation (and the smart process object 42e) may also include predefined connection points (marked by an "X" in the data store 53c) that enable an operator or configuration engineer to attach upstream or downstream components to the process element, as depicted by the graphical representation. Of course, these connection points also enable the smart process object 42e to be aware of the elements connected to that smart object as configured within a process module and may specify a type of connection element that must be used, such as a pipe, a duct, etc., a stream associated with that element, etc.

The smart process object 42e may also include one or more inputs 54 and outputs 56 to enable communication with other smart process objects within or outside of a process module in which the smart process object 42 is used. The connections of the inputs 54 and outputs 56 to other smart process objects may be configured by a configuration engineer during configuration of a process module by simply connecting other smart process objects to these inputs and outputs or by specifying particular communications that are to take place between smart process objects. Some of these inputs and outputs may be defined as being connected to the smart process objects connected at the predefined connection points for the smart process object as discussed above. These inputs 54 and outputs 56 may also be determined or defined by a set of rules within the rule database 50 and the connection matrix 52 defining the connections between different devices or entities within the plant 10. The inputs 54 and the outputs 56, which include data stores or buffers associated therewith will, generally speaking, be used to provide communications of data from other smart process objects to the smart process object 42e or to provide communications of data stored within or generated by the smart process object 42e to other smart process objects. These inputs and outputs may also be used to provide communications between the smart process object 42e and other objects within the process control system, such as control modules within the controllers 12, field devices 14, 16, etc.

As illustrated in FIG. 2, the smart process object 42e also includes a method storage 58 that is used to store zero, one or more methods 60 (illustrated as methods 60a, 60b and 60c in FIG. 2) which may be algorithms to be implemented by the smart process object 42e during execution of a process module in which the smart process object 42e is used. Generally, the methods 60 stored in the method storage 58 will use the data stored within the data storage portions 53a and 53b and data obtained from other smart process objects or even data from other sources, such as the configuration database or historian 28, via the inputs 54 and the outputs 56 to determine information about the process plant 10 or an entity within the plant 10. For example, the methods 60 may determine poor or bad operating conditions associated with the entity defined by the smart process object 42e, errors associated with that or other entities within the process plant 10, etc. The methods 60 may be preconfigured or provided based on the type or class of smart process object and will generally be executed each time the smart process object 42e is executed within the execution engine 48 during runtime. Some example methods 60 that may be provided within a smart process object, such as the smart process object 42e, include detecting leaks, dead band, dead time, movement, variability, condition monitoring, computing costs, or other conditions associated with the entity.

The methods 60 may also be provided to help simulate the operation of the process entity associated with the smart process object on the material flowing through that process entity. Thus, the methods 60 may be provided to calculate mass balances, energy balances, flows, temperatures, compositions, vapor states, and other system-level or stream level parameters associated with the material in the plant 10, to simulate operation of the element so as to calculate expected outputs based on provided inputs, etc. Of course, these are but a few of the methods that can be stored in and run by a smart process object 42e, and there are many other methods that may be used, with such methods generally being determined by the type of entity being represented, the manner in which that entity is connected in and used in a process plant as well as other factors. It is important to note that, while the smart process object 42e may store and execute methods that detect system-level conditions, errors, etc., these methods may also be used to determine other information about devices, logical elements, such as process control modules and loops, and other non-system-level entities. If desired, the methods 60 may be programmed or provided in any desired programming language, such as C, C++, C#, etc. or may be referenced to or may define applicable rules within the rule database 50 that should be run for the smart process object 42e during execution.

If desired, each smart process object may include a library of applicable algorithms or methods which may be used to define the simulation behavior of the smart process object when connected within a process module. Such a library is illustrated in a pull down menu 61 for the smart process object 42e of FIG. 2 and a similar menu may be associated with each other smart process object. The configuration engineer may define the simulation behavior of a smart process object when this smart process object is placed in a process module 39 by selecting one of the library of simulation algorithms (called method 1, method 2, etc.) via, for example, the pull down menu 61. In this manner, the configuration engineer may define different simulation behaviors for a smart process object depending on the type or nature of the process for which the smart process object is being used to model.

If desired, the configuration engineer may instead provide a proprietary or other user supplied algorithm to define the simulation behavior of the process element defined by the smart process block. Such a user defined algorithm (illustrated as the "user defined" entry in the pull down menu 61) may be provided to and stored in a smart process object when that smart process object is placed within or used within a process module 39. This functionality enables the simulation behavior to be customized by the user to thereby provide for better or more accurate simulation. If desired, and as will be described in more detail later, the smart process objects 42 or each process module 39 may include an operator actuatable switch (such as an electronic switch or a flag) that disables the use of the simulation algorithms within the smart process objects and that, instead, causes the behavior of the process module to be determined by a high fidelity simulation package or program, such as one provided by HYSYS. In this case, the smart process object or the process module obtains simulated parameter data from the high fidelity simulation, as opposed to using the simulation algorithms within the smart process objects themselves.

During execution of a graphic display 35 or a process module 39 by the execution engine 48, the engine 48 implements the communications defined by the inputs 54 and outputs 56 to each of the smart process objects in the graphic display 35 or process module 39 and may implement the methods 60 for each of those objects to perform the functionality provided by the methods 60. As noted above, the functionality of the methods 60 may be located in programming within the smart process object or defined by a set of rules within the rule database 50 that the engine 48 executes, based on the type, class, identification, tag name, etc. of a smart process object, to implement the functionality defined by those rules.

It will be noted that an instance of the smart process object 42e has a tag or unique name within the context of the process module with which the smart process object 42e is associated and this tag or unique name may be used to provide communications to and from the smart process object 42e and may be referenced by the execution engine 48 during runtime. Process module tags should be unique within the control system configuration. This tagging convention enables elements within the process modules 39 to be referenced by elements within others of the process graphic displays 35, process modules 39 and even the control modules 29. Still further, the parameters of the smart process object 42e can be simple parameters, such as simple values, structured parameters or smart parameters that know the expected units and attributes associated therewith. Smart parameters can be interpreted and used by the process rules engine or execution engine 48 to assure all signals are being sent in the same units or are converted properly. Smart rules can also be used to turn on and turn off groups of alarms for the smart process objects (or process modules) to create a smart alarm strategy and/or interface for the operator. Still further, smart process object classes can be associated with equipment and module classes within the process control strategy of the plant 10 to provide a known linkage between a smart process object and the process variables it will need to interpret or access.

Smart process objects, when used in process graphic displays or process modules, may also include mode of operation, status, and alarm behavior so that these smart objects may be put in different modes during runtime, such as the off, start-up, and normal modes, may provide a status associated with the object based on its current operating state, and may provide alarms based on detected conditions, such as a parameter out of range, limited, high variability, etc. Smart process objects may also have a class/subclass hierarchy which enables them to be categorized in class libraries, to be collected together in a composite structure, etc. Still further, smart process objects may utilize information from other elements, such as control modules and other objects to enable the smart process object to recognize when its associated entity is busy or, for example, acquired by a batch control process within the plant 10.

Smart process objects may be associated with any desired process entity, such as physical devices like pumps, tanks, valves, etc., or logical entities such as process areas, measurements or actuators, control strategies, etc. In some cases, smart process objects may be associated with connectors, such a piping, conduit, wiring, conveyors, or any other device or entity that moves material, electricity, gas, etc. from one point to another point within the process. Smart process objects that are associated with connectors, sometimes referred to herein as smart links or connector elements, are also tagged (even though the actual device or connector itself may not be tagged or able to communicate within the process plant 10), and are generally used to represent material flow between other elements in the process.

Smart links will typically include properties or parameters that define how different materials or phenomena (such as electricity) flow through the connection (e.g. steam, electricity, water, sewage, etc.) These parameters may indicate the type and nature of flow (such as the general speed, friction coefficients, type of flow like turbulent or non-turbulent, electromagnetic, etc.) through the connector and the possible direction or directions of flow through the connector. Smart links may include programming or methods that ensure that the units of the source and destination object to which the smart link connects, match and, if not, may perform a conversion. The methods of the smart link may also model the flow through the connector using a model or an algorithm to estimate the speed or nature of the flow through the actual connectors, length and size of the physical connections, transport delay, etc. The stored parameters for the smart process object (such as friction parameters) may be used in these methods. Thus, in essence, the smart links or connector elements enable smart process objects to be aware of the other upstream and downstream objects or entities. Of course, smart links may, for example, define the connections between other objects, the type of fluid, such as liquid, gas, electricity, etc. within the system, the upstream and downstream side of the entities, which other entities are upstream and downstream of the entity for this smart process object, the direction of material, fluid, electric flow, etc. in any desired or convenient manner. In one embodiment, the matrix 52 may be created prior to execution of process flow modules and may define for the smart links the interconnections between the different devices within the plant and, therefore, the interconnections between the different smart process objects. In fact, the execution engine 48 may use the matrix 52 to ascertain the upstream and downstream entities and thereby define the communications between the smart process objects and the methods associated with the smart process objects. Still further, one or more sets of rules may be provided to be used by the smart process objects to interact with each other and to obtain data from each other as needed for the methods within the smart process objects and to resolve the impact of smart objects associated with output connections.

If desired, the smart process object 42e may also include hot links, such as URLs, to key documentation which may be applicable to the type of object, or which may be specific to the instance (depending on the criticality and application) of the device to which the smart process object 42e pertains. The documentation may be vendor supplied as well as user-specific. Some examples of documentation include configuration, start-up and shut-down procedures, operational and maintenance documentation. If desired, an operator may click on the object as displayed in an operator display to bring up the instance specific (if any) and generic documentation for the object or associated device. Also, the operator may be able to add/delete/change documentation independently of the system software such as maintenance requests, records of operational problems, etc. Furthermore, these hot links may be user configurable or changeable to provide the ability to add knowledge links to objects in the an operator interface, to provide for quick navigation to appropriate information associated with the object and to provide the ability to add work instructions specific to the customer, to the specific object type or even to the specific instance of the object.

While the process modules and process graphics are described above as being created together by the interconnection of different smart process objects, they may be created separately. For example, a process graphic may be created using smart process objects and, when completed, a process module for that graphic may be generated based on graphic elements and their interconnections in the graphic display. Alternatively, the process module may be first created using smart process objects and, once created, a graphic display for that process module may be automatically generated by the configuration application 38 using the graphic display elements in the smart process objects used to create the process module. Still further, a process module and a graphic display may be created separately and the individual elements within these two entities may be tied together manually by referencing one another (e.g., using the tag properties of the elements within the graphic display and the process module). Through this mechanism, a smart process object may be referenced by multiple displays. In any event, once created, a process graphic display and an associated process module may be run independently or separately, although they will typically communicate parameters and information back and forth as desired or needed.

Generally speaking, a set of predefined graphic elements may be provided in the configuration application to enable a user to construct process graphic displays that reflect the process plant. These displays have graphic display elements designed to dynamically show on-line measurements and actuators that interface with the control system and, as a result, may present information typically monitored and utilized by operators or other personnel involved in on-line operations. In addition, unmeasured parameters that reflect process operation may be calculated using on-line process simulation provided in the process modules and may be shown as an integral part of the associated graphic displays. In these and other ways, the process graphic displays may provide information typically monitored and utilized by plant personnel other than operators, such as engineering personnel or management.

Additionally, in an offline environment that may be used for engineering or training simulation purposes, the process simulation values provided by the process modules may be used and/or displayed in place of the actual process measurement values otherwise provided by the graphic elements and the associated control modules. These simulation values, which may be calculated by the associated process modules or a third-party simulation application (e.g., HYSYS), may be based on actual plant settings (e.g., an actuator position or state) as well as user-specified disturbance settings or values that may be established via, and depicted in, the process graphic displays and their respective graphic display elements. To these ends, a content layer of the process graphic display customized for an offline view of the process graphic displays may be generated and made available in, for instance, a training context. Further details regarding this content layer of the process graphic display are set forth below.

More generally, the process graphic displays may be used in a variety of contexts involving both on-line or control situations, and off-line or simulation situations, by a number of different types of personnel. To this end, each process graphic display may have a plurality of content layers dedicated to these different contexts, situations and personnel. Unlike past systems having separate, independent displays, these dedicated content layers are integrated portions of the objects used to define them, in the sense that the same object or objects have associated therewith the information necessary to generate all of the different content layers. As a result, the content layers of a single process graphic display provide customized views without requiring a configuration engineer or other design personnel to create a separate display for each of the views.

The breadth of information required to generate customized user interface displays for the different functions (operations, engineering, maintenance, management, etc.) is provided and supported by a flexible and extensible set of graphic display elements and the simulation algorithms associated therewith. These graphic display elements, which may correspond with a number of different types of process plant elements, including stream elements, process connection elements, actuator elements, processing elements, measurement elements and estimated property elements, may be predefined or otherwise made available for use in creating the process graphics display and its broad functionality. Custom elements may also be created or generated by a configuration engineer to cover specific types of the foregoing process plant elements, composites of such elements, and entirely new elements composed from basic graphic shapes (e.g., lines, circles, etc.).

Stream elements generally define a stream of material in the process plant and may be exposed in the graphic display to show the composition, density, flow, temperature, pressure, weight, and/or any other parameters defining the stream of material. Stream elements may be defined at the input of the process module and provided to elements within the process module to thereby enable the flow of material through the process module to be modeled and depicted in the graphic display. Similarly, stream elements may be illustrated at the output or end of the process module to illustrate in the graphic display the material output of the portion of the process plant depicted by the graphic display. Stream elements also may be used to define how different graphic displays (and the associated process modules) are connected with one another. For example, the output stream in one process module may be the input stream in another process module and may supply the values used at the input stream of the other process module. Streams may contain the following four parts: name (e.g., pH stream), direction (e.g., flow input), measurement (e.g., flow, pressure, temperature), and composition (e.g., nitrogen, ammonia, etc.) However, streams could have other parts or parameters if so desired.

Process connection elements define the manner in which materials within the plant, such as solid materials, liquid and vapor, and gases are delivered or carried from one device to another. To clearly illustrate the material flow through the process, three different types of process connections including piping, ducts and conveyors may be used. Of course other connection elements, such as electrical cables to address power flow in electrochemical processes, etc. may be used as well. Piping is generally used to illustrate (and simulate) liquid and high pressure vapor or gas flow within the plant. Ducts are generally used to illustrate (and simulate) low pressure gas flow within the plant. Conveyors are generally used to illustrate (and simulate) the movement of solid material between processing units. As a result, each process connection element defines the type of connection, such as a pipe connection, a duct connection or a conveyor connection that is used to provide material at the input or output of a device.

If desired, the properties of the material that is being transferred by a connection are determined by the upstream input. This information plus a connection status variable defining if the connection is complete may be made available as properties of the connection element on the graphic display. A connection element may start at a processing element output, an actuator element output or a stream element output. In a similar manner, a connection element may terminate at a processing element input, an actuator element input or a stream input.

The properties of a connection element may be automatically displayed when the cursor is placed over the connection element in the graphic display. Also, the properties associated with a connection element may be exposed for permanent display by placing a measurement or estimated property element (defined below) on the connection element. If desired, a connection element may be created by holding the left mouse button down over an element output (such as a stream output, a processing element output or an actuator element output) and, while holding down a button on the mouse, positioning the cursor over an element input. For the connection to be established successfully, the input and the output types (pipe, duct, or conveyor) of the upstream and the downstream elements must match. The connection will automatically take on the type of the upstream element.

If desired, piping elements can be shown or depicted in the process graphic display as a pipe connection, duct elements (e.g., air or gas) can be shown as a duct, and conveyor elements may be shown as conveyor belts. Piping, duct and conveyor element connections can be automatically routed between processing elements and arrows may be displayed outside the depiction of these elements to show the direction of the flow. If an upstream output is common to two connections, then a "T" element may be included in the pipe, duct or conveyor. Similarly, "T" elements may be used to combine multiple outputs. The color or other graphic property of a conveyor element may change to indicate its status, e.g., running/stopped, flowing/not flowing, plugged, etc. Generally speaking, the material flow along a conveyor is determined by the motor drive connected to the conveyor. Thus, a motor drive actuator (which is an actuator element described in more detail below) may be connected to the conveyor. Additionally, measurement elements (described below) can be connected to pipe, duct and conveyor elements to make it possible to expose measurements associated with the pipe, duct or conveyor elements, such as the speed of the conveyor or the flow of material in a pipe or duct, the properties of the material on or in the conveyor, pipe or duct, e.g. moisture or weight. Also, an exposed property element may be added to display properties of the material on or in the pipe, duct or conveyor that are not measured, for example, the composition of the material.

If desired, each of the piping, duct and conveyor connection elements may graphically and dynamically reflect a lost connection (e.g., by a color change), and that a selected property (pressure, temperature, length, etc.) is outside configured limits (e.g., by a color change). Furthermore, parameters calculated by the associated process module may be exposed in the graphic. For example, properties provided by the upstream connection, whether the connection status is bad or good, limits on one or more selected parameters of the connection element, etc. may be exposed in the graphic display to provide information to the operator about the connection element or the stream being transferred by the connection element.

Generally speaking, actuator elements are elements that perform some actuation function with respect to the stream and may be placed between different connection elements or between a processing element and a connection element. Examples of actuator elements include a regulating valve (with actuator), an on-off valve (with actuator), a pump (with motor), a force draft fan (with motor), an induced draft fan (with motor), an eductor (with on-off valve), a damper (with drive), a feeder (with variable speed motor), a conveyor motor drive (which may be attached to a conveyor element), etc.

The graphic depiction of the valve elements may dynamically reflect the implied valve position (by animation, for example), valve failure (by a color change, for example), the valve full open/closed position (by a color change, for example), and the AO, DO, DC, setpoint, PV, OUT, mode, etc. (by a numeric string or other indication, for example) of the associated control block controlling that valve. The simulation element associated with the valve elements (used in the process module) may have simulation algorithms that calculate parameters associated with the valve actuator, such as the discharge pressure, mass flow, liquid temperature, liquid composition, inlet pressure, and outlet pressure. These simulated or calculated parameters may be exposed in the process graphic, if so desired. However, the user or configuration engineer must usually configure the reference to an AO, DO or DC block in a control module associated with the valve as well as the valve type (e.g., linear, quick opening, equal percentage, valve sizing, etc.) and the stroke time from open to close. Of course, the simulation algorithms available to simulate the operation of the valve on the material flowing through the valve may be dependent upon the type of the valve and sizing information.

The graphic depiction of pump elements may dynamically reflect the motor status (using, for example, a color change), the associated DO or DC function block mode and setpoint (using, for example, strings), the motor speed (if variable speed drive is used), the AO setpoint, PV, OUT mode (if variable speed drive is used) and other desired parameters. Likewise, the process simulation (used in the process module) for this element may determine or calculate parameters such as the discharge pressure, liquid composition, liquid temperature, and mass flow, which parameters may be exposed in the graphic display. The user may need to define a pump curve based on the pump type. However, the user may configure the reference to the DO or DC block associated with the motor start/stop, the reference to the associated AO function block for variable speed drive (if used), and the pump curve (e.g., pressure versus flow) for the defining the operation of the pump.

The graphic depiction of a force draft or an induced fan actuator element may have a depiction that dynamically reflects the motor status, DO or DC function block mode and setpoint, motor speed (if variable speed drive is used), the AO setpoint, PV, OUT, DO or DC function block mode (if variable speed drive is used) and other desired parameters, any of which may be exposed in the graphic display. The process simulation element (used in a process module) for this element may determine or calculate parameters such as the discharge pressure, gas composition, gas temperature, and gas mass flow, which parameters may be exposed in the graphic display. The user may configure the reference to the associated DC block for motor start/stop, the reference to an AO block for variable speed drive (if used), and the fan curve (pressure versus flow) for defining the simulated operation of the fan.

In some cases a particular type of actuator may only be used with a specific type of connection, e.g., a pipe, a duct or a conveyor. The table below defines some example connection limitations for typical actuator elements.

|  | Pipe | Duct | Conveyor |
| --- | --- | --- | --- |
| Regulating valve | X |  |  |
| On-Off Valve | X |  |  |
| Pump | X |  |  |
| Eductor | X |  |  |
| Force Draft Fan |  | X |  |
| Induced Draft Fan |  | X |  |
| Damper Drive |  | X |  |
| Feeder | X |  | X |
| Motor Drive |  |  | X |

Processing elements include plant equipment that processes the materials or streams in the plant in some manner. Generally speaking, all inputs and outputs to and from processing elements will be made through connection elements. Standard processing elements include tanks (vertical and horizontal), heaters, static mixers, reactors, mixers, air heaters and any other elements that perform some type of simple or standard processing activity. For standard processing elements, the user may specify the number of inputs and outputs to the element along with the physical equipment properties e.g. size, volume, etc. The simulation algorithm and static representation of these standard processing elements may be set so that they cannot be modified by the user but may be selectable as described above at configuration time. Of course, if desired, other, typically more complex plant equipment (such as distillation columns, evaporators, separators, boilers, etc.) may be implemented as custom processing elements. The static representation, number of inputs and outputs and the simulation algorithm of such custom processing elements may be modified to meet the user interface requirements. Once a custom processing element has been defined, it may be saved as a composite or template that may be reused or used as a starting point in the creation of other processing elements.

The tank standard processing element (either vertical or horizontal) may be configured based on the pipe connections to the tank and the tank element may dynamically reflect the level in the tank (using, e.g., dynamic animation), and the level at 100% or empty (using a color change, for example). The process module simulation for the tank may calculate and expose, via the graphic display, parameters such as the outlet temperature, the outlet composition, the liquid temperature and the simulated level of the tank. However, to tie the tank into the system, the user or configuration engineer may need to configure the number of input and output connections, the complete connections to the tank, the tank properties, such as size (e.g., diameter and height), etc.

The heater processing element may dynamically calculate and reflect, via the graphic display, the heat transfer coefficient (e.g., using a color change), the outlet product temperature, the inlet product temperature, the outlet pressure (assuming fixed drop), etc. A user or configuration engineer may need to configure the complete connections to the heater, the heater surface area and the heat transfer coefficient when clean.

Of course, other processing elements such as a static mixer, a reactor, a mixer, an air heater, a heat exchanger, etc. may have display and simulation capabilities that are tailored to these types of devices. Non-standard processing elements, such as distillation columns, evaporators, separators, boilers, etc. may be represented graphically using a custom processing element in which the simulation associated with the vessel may be user defined if not included in a standard selection. The processing in these elements may be described or defined as a step response model relating each input to each output of the vessel. Inputs may be gas and/or liquid streams. Optionally, the user may define the equations that describe the relationships between the inputs and outputs of the processing element and these equations may be stored in the process module using that element to perform simulation. If desired, some simple static graph representations may be provided to help the user quickly create the static graphics associated with a custom processing element. If these simple graphics are used, then the user may need to only specify the desired number of input and output connections and the type of connection supported (e.g., pipe, duct, or conveyor) supported by the custom processing element. In response, the graphic item will be displayed and can be immediately used in the creation of the operator graphic. If desired, the gains and any dynamics associated with each input and output of the process element may be specified if the user elects to specify the simulation algorithm as step responses. If the user selects a custom algorithm, then an expression editor may be provided for the user to define the simulation algorithm. Based on the method selected, the properties of the custom processing element outputs may be calculated differently. Furthermore, the user may reference one or more of the algorithms that they have defined in a separate software assembly.

Additionally, several pre-defined composites or templates may be provided for creating custom processing elements. These templates may include, for example, a boiler template having a custom algorithm that calculates the exit gas $O_2$, the exit gas CO, the steam generated, the boiler drum level and the boiler draft. Such a template may be based on a single fuel input. However, by modifying the template, it is possible to simulate boilers with multiple fuels. Other pre-defined templates may include a specialized vessel-cyclone separator template, which may be used with in conjunction with a spray dryer custom processing element, and which may include a step response model to model the operation of the separator. Likewise, a column template, a spray dryer, and an evaporator body may utilize a step response model to define the expected process response. In an evaporator, based on the energy input and the concentration of the input flow, the concentration of the outlet flow and vapor release can be calculated. Multiple evaporator elements may be connected together along with heat exchanger and eductor elements to create a multiple-effect evaporator. Similarly, a specialized vessel-stack custom template processing element may be used with the boiler processing element. In this case, the properties of the inlet may be carried through the stack with no modifications if so desired, or to reflect emissions reductions performed in the stack.

Other types of elements that can be used to create process graphic displays and process modules include measurement elements and property elements. Measurement elements include transmitter elements, which may be used in the graphic display to access the measurement value associated with a physical transmitter, and switch elements. Generally, the transmitter element may dynamically reflect bad or uncertain status, the mode of the associated AI function block in the control module, the measurement value and units, etc. associated with an actual transmitter (sensor) or other data associated with the actual transmitter. In an off-line mode (or simulation mode) the transmitter element may be used to access and display the simulation value provided by the process module rather than the value associated with the AI or PCI block or may be used to provide a measurement value to the associated AI block in the control module as a measurement to be used in the simulated control routine. The transmitter element can be added to a connection element or to a processing element and, when such a transmitter element is added to the display, the user will generally need to identify the associated AI, PCI or DI block in controller scheme that is providing the measurement. In the on-line mode, the value of the measurement may be shown next to this measurement element. In the off-line mode (or simulation mode) the simulated value of the measurement (as developed by the corresponding process module) may be automatically displayed. In on-line operation, the user can elect to switch control and display to the simulated value in the event of a measurement failure.

A switch element may dynamically reflect a bad or uncertain status, the mode of the associated DI (e.g., manual or OS), and the discrete value of a switch (on, off, etc.) When in an off-line simulation mode, the user may use the switch display element to access and change the switch parameters in the graphic display and control module by selecting a simulation value or a manual value and status and by manually entering the value and status of the switch. However, a user may generally configure the switch element by providing a reference to an associated DI block in the control scheme, a reference to the element property that triggers the switch, and the limit and deadband associated with a change of state of the switch.

An estimated property element generally exposes an estimated property of the system as determined by the process module and may be added to a connection or processing element to display any property of that element. When this element is placed on a connection element or on a piece of equipment, the user can browse and select the properties that will be displayed. Thus, simulated properties that are not available through a physical measurement may be exposed through the use of the estimated properties element. Such an estimated property element may dynamically reflect a good/bad connection, the estimated property value(s), and a property that is outside of an associated limit or change. A user must generally configure the reference to property(s) to be displayed and the limits and color changes for the element if the property is outside of the limits.

As will be understood, by attaching transmitter elements and estimated property elements to processing elements, actuator elements and connection elements, the properties associated with the inputs and outputs of these process plant elements may be referenced during on-line operation or off-line simulation. These properties may also be made visible in the process graphic display.

Figure 3:
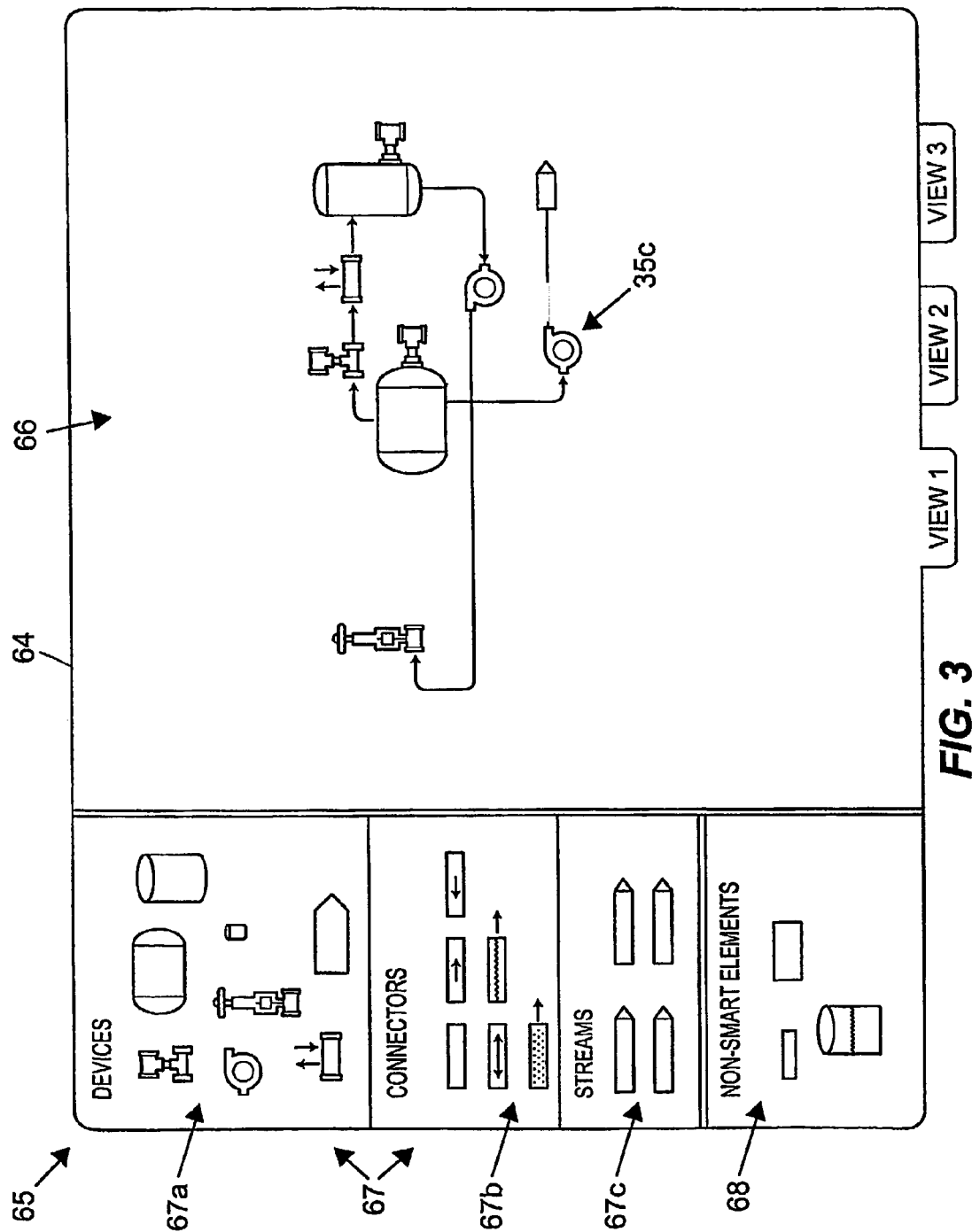
FIG. 3 is a simplified depiction of a configuration screen used by a configuration engineer to create a process graphic display or a process module using smart process objects stored in an object library.

Generally speaking, an operator may run or execute the configuration application 38 to create one or more process modules 39 or process graphic displays for implementation during operation of the process 10 or for implementation in a simulation environment. The configuration application 38 presents a configuration display, such as that illustrated in FIG. 3, to the configuration engineer. As seen in FIG. 3, a configuration display 64 includes a library or template section 65 and a configuration section 66. The template section 65 includes a depiction of sets of template smart process objects 67, which may include the smart process objects 42 of FIG. 2 and may be any of the connection, measurement, stream, processing, and estimated property elements described above. If desired, non-smart elements 68 that only have a graphic definition may also be provided. Essentially, the templates 67 and 68 are generic objects that may be dragged and dropped onto the configuration section 66 to create an instance of a smart process object within a process module or graphic display (or both). A partially completed process graphic display 35*c* is illustrated as including a valve, two tanks, two pumps, a flow transmitter and two sensors interconnected by flow path connectors, which may be smart links or connector elements as described above and providing a stream output. It will be noted that the graphic display 35*c* may be made up of both smart process objects and non-smart elements.

When creating a graphic display, such as the graphic display 35*c* (or a process module), the configuration engineer may select and drag the smart process objects 67 and the elements 68 illustrated in the template section 65 onto the configuration section 66 and drop them there in any desired location. Generally, the configuration engineer will select and drag one or more smart device process objects 67*a* or non-smart elements 68 depicting devices onto the configuration section 66. The configuration engineer will then interconnect the smart device process objects within the configuration section 66 with smart connector process objects 67*b* and may place input and output streams 67*c* into the display. Moreover, non-smart elements may be added to the display. The configuration engineer may change the properties of each of the smart process objects during this process using pop-up properties menus, etc. and, in particular, may change the methods, parameters, tags, names, hot links, modes, classes, inputs and outputs, etc. associated with these smart process objects. When the process or configuration engineer has created a process module with each of the desired elements, typically representing a process configuration, area, etc., the configuration engineer may define rules or other functionality associated with the module. Such rules may be execution rules such as those associated with the performance of system-level methods, like mass balance and flow calculations. The process engineer or operator may also decide to add trends and faceplates that would be useful when the process display is on-line. After creating the graphic display 35*c*, the configuration engineer may save that display in a memory and may, at that time, or later, instantiate and download that display to the execution engine 48 in a manner that the execution engine 48 may provide a graphic display. Of course, the configuration engineer could create a process module in the same or similar manner although different graphics may be depicted for process module elements as opposed to process graphic display elements. Furthermore, the operator may elect to turn on levels of detail while they are running the plant. For example, one of the levels of detail would show the composition at each connection.

As noted above, the process graphic or process module may be provided with a specific tag. For example, smart process object elements within a graphics display or a process module may be provided a tag including an alias that can be filled in or selected at runtime by, for example, the execution engine 48 based on other factors, such as a piece of equipment or a route selected within the process control system. The use of alias names and indirect referencing in process control systems is discussed in detail in U.S. Pat. No. 6,385,496, which is assigned to the assignee of the present invention and which is hereby expressly incorporated by reference herein. Any of these techniques may be used to provide and resolve aliases in tags for the smart process objects described herein. With the use of aliases and the like, the same process module may include or be used to support different views for sets of equipment, etc.

The configuration application 38 may be used to design the display 64 of FIG. 3 in a multi-layered manner such that, for example, tabs (View 1, View 2 and View 3) may be used to access and create different views of the process module or graphic display. These tabs may be used in this configuration environment to access and create the different views, and may, or may not, be made available for switching between such views during runtime (i.e., when the execution engine 48 generates the process graphic display for a user). In either case, the different views may be selectively provided to support different users associated with the process plant. Further details regarding these different views, and the manner in which the views may include or use the same smart process objects (or different subsets thereof) in respective content layers of the same process graphic display, are provided below.

Before further discussing the customized content layers made available to different types of users, the nature and configuration of process graphic displays are now described both generally and in connection with an exemplary display. Generally, when the configuration engineer creates a process module or a graphic display, the configuration application 38 automatically stores the smart process objects, along with the connections therebetween, in a database. This database may then be used to create other process modules and graphic displays using one or more of the same smart process objects. As such, when creating the further displays, the configuration engineer can simply reference the smart process object, as already created and stored within the database, and any methods, etc. stored therewith to place that smart process object in the further display. In this manner, the database may be populated as the process control modules and graphic displays are created and the database may be used at any time to create and execute other displays and modules using smart process objects which already exist within the process flow database. Using such a database, each smart process object within the database may support or be used in process modules and referenced in multiple graphic displays. As will also be understood, the process modules may be constructed by building displays for these modules and then specifying flow algorithms to be used in or associated with process modules. Of course, individual process modules may be spread across and executed by different computers and process modules may be communicatively connected to one other to operate in conjunction with each other, either on the same or on different computers. When this is done, input and output streams will be externally referenced to tie process modules together.

As noted above, the configuration engineer may, as part of the process module or graphic display creation, attach or provide the simulation algorithm of the process module. These simulation algorithms may be preconfigured to calculate or determine certain process or system-level properties, such as mass balance calculations, flow calculations, efficiency calculations, economic calculations, etc. with respect to the process depicted or modeled by the process module. As a result, the process modules themselves may have mode, status, and alarm behavior, can be assigned to workstations, and may be downloaded as part of the display downloads. If desired, the simulation algorithms may be executed by the execution engine 48 to perform mass or heat balancing, flow routing, flow efficiency, flow optimization, economic calculations related to process simulation or other desired calculations using the data provided in the smart process objects of the process module. Still further, these simulation algorithms may access parameters from the control strategy, i.e., the control modules associated with and downloaded to the controllers, field devices, etc. and may, conversely, provide data or information to these control modules.

It will be understood that the execution engine 48 is needed to enable the process algorithms to execute across an amalgamation of all process objects and links configured on all displays. Thus, the simulation algorithms (within the process modules) will generally execute regardless of whether any associated graphic display is loaded, i.e., called up and currently displaying information to a user. Of course, the simulation algorithms may be cross-checked across the entire process 10 or across defined subsets of the process 10. It will also be understood that, during execution of any particular process module, the execution engine 48 may provide a display to an operator (or other user type) on a display device depicting the interconnected objects or entities within the process module based on the graphic display associated with that process module. The parameters, graphics, etc. of the display will be determined by the configuration and interconnection of the smart elements within the process module. Furthermore, alarms and other information to be provided on this or other displays may be defined and generated by the methods within the smart process objects and the simulation algorithms associated with a particular process module. If desired, the execution engine 48 may provide a display for a process module to more than one operator interface or may be configured or set to provide no display, even though the execution engine 48 continues to execute the process flow module and thereby perform the methods, alarm behavior, flow algorithms, etc. associated therewith.

Figure 4:
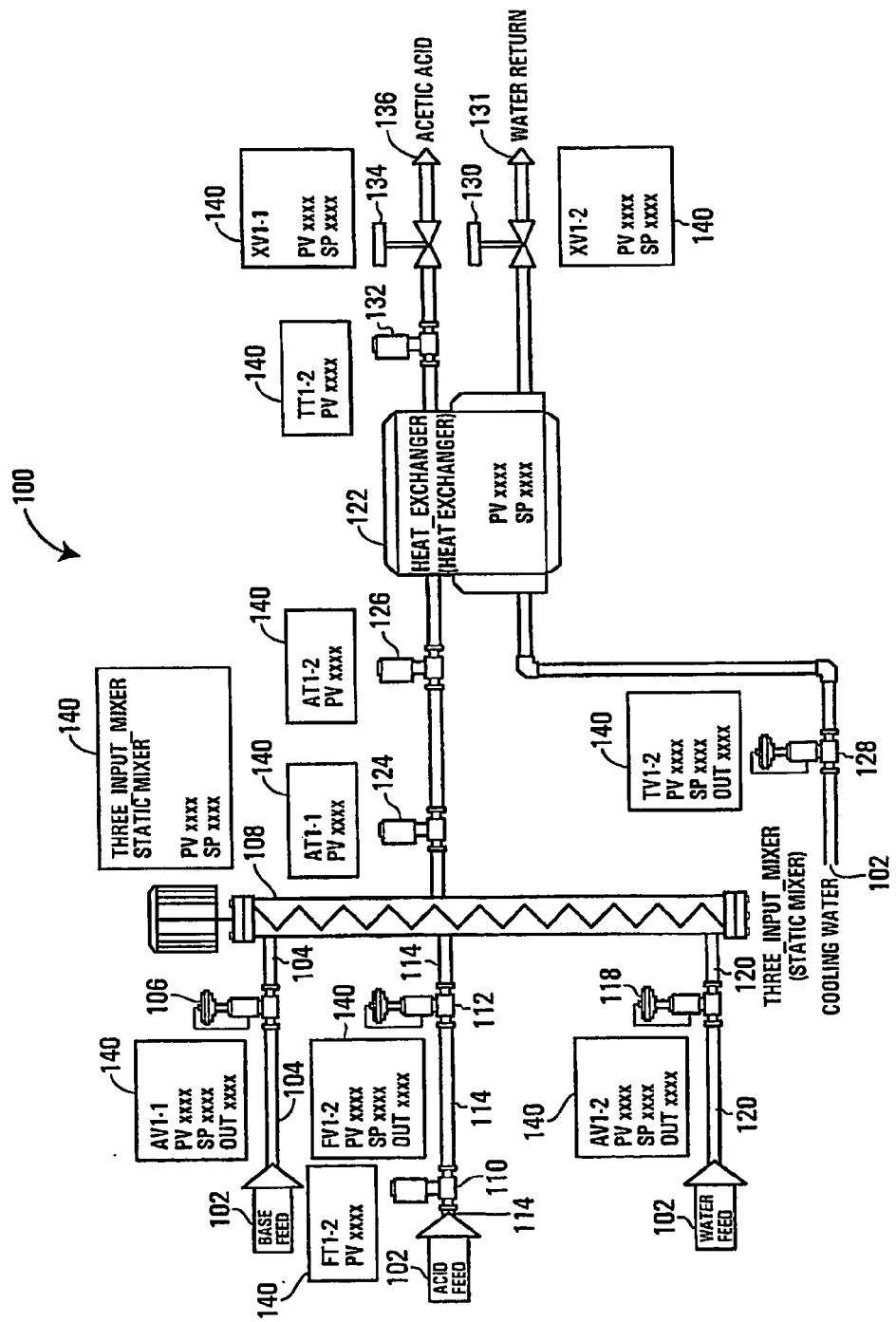
FIG. 4 is a detailed depiction of an exemplary process graphic display including a depiction of streams and connection elements within the process plant, the depiction being created by interconnecting the graphic display elements of a number of smart process objects.

FIG. 4 illustrates an exemplary process graphic display 100 that may be created using the elements and configuration applications described above. In particular, the graphic display 100 depicts a portion of process plant that produces white vinegar from water, acid and a base. As illustrated in FIG. 4, the process graphic display 100 includes four stream elements 102 at inputs thereto defining the streams of Base Feed, Acid Feed, Water Feed and cooling water. The Base Feed stream 102 is delivered through a piping connection element 104 to an actuator element in the form of a valve 106. The output of the valve 106 is connected to a first input of a mixer 108 via a piping connection element 104. In a similar manner, the Acid Feed 102 is connected to a transmitter element 110 and then to a further valve 112 which is connected to the mixer 108. The Acid Feed 102 and transmitter 110, the transmitter 110 and the valve 112 and the valve 112 and the mixer 108 are connected via piping connection elements 114.

As can be easily seen, an output of the mixer 108 is connected to a heat exchanger 122 via piping and two transmitters 124 and 126. The cooling water stream 102 is delivered to the heat exchanger 122 via a valve 128 and exits the heat exchanger via a valve 130 to produce a return water stream element 131. Likewise, the output of the heat exchanger 122 is delivered through a transmitter element 132 and a valve 134 to provide an output Acetic Acid stream element 136. While not always called out in particular, the elements in the graphic display are in all cases connected with one another via piping connection elements.

It will be understood that display boxes 140, which may be generated as properties of the display elements themselves or which may be separate elements in the form of transmitter and estimated property elements or elements that reference blocks in control modules, are illustrated in the graphic display 100 to indicate or expose parameters, such as process variable (PV) values, setpoint (SP) values, OUT values, etc. associated with the different elements. Additionally, if the user were to place a cursor over some of the elements, the display 100 may illustrate other values associated with the referenced elements. For example, placing the cursor over one of the stream elements (such as the Acetic Acid stream output 136), may cause the graphic to indicate the composition, pressure, temperature, density, flow rate, etc. of the acid stream at this point in the process. Of course, the values and parameters displayed on the graphic display 100 may be delivered from an actual referenced transmitter within the process control system (such as from an AI block in the control system), or from a process module simulation element that simulates the functionality of the element. The graphic display 100 of FIG. 4 may be provided to a user during operation of the process which makes white vinegar or to implement a simulation of that process to be used, for example, to perform design or operator training activities.

It will be understood that the functionality of the smart process objects, the graphic display elements and the process modules described herein may operate in the operator workstation 20 and does not need to be downloaded to and configured within the controllers, field devices, etc. within the plant 10, which makes this functionality easier to implement, view, change, etc. Further, this functionality enables system level determinations to be made more easily than within the process devices, controllers, etc. because the information pertaining to the devices on a system level is all typically available to the operator workstation 20 in general and to the execution engine 48 in particular whereas all of this information is not typically made available to each controller and field device within the process plant 10. However, when it is advantageous to do so, some of the logic associated with the process modules, such as primitives, may be embedded in the devices, equipment and controllers down within the process plant. The use of smart process objects to create integrated process control modules and graphic displays enables the execution engine 48 to, for example, automatically detect leaks and produce smart alarms with minimal amounts of user configuration activities, to calculate and track flow and mass balances within the plant 10, to track losses within the plant 10 and to provide higher level diagnostics for the plant 10 and to simulate the operation of the plant during engineering design and operator training.

Figure 5:
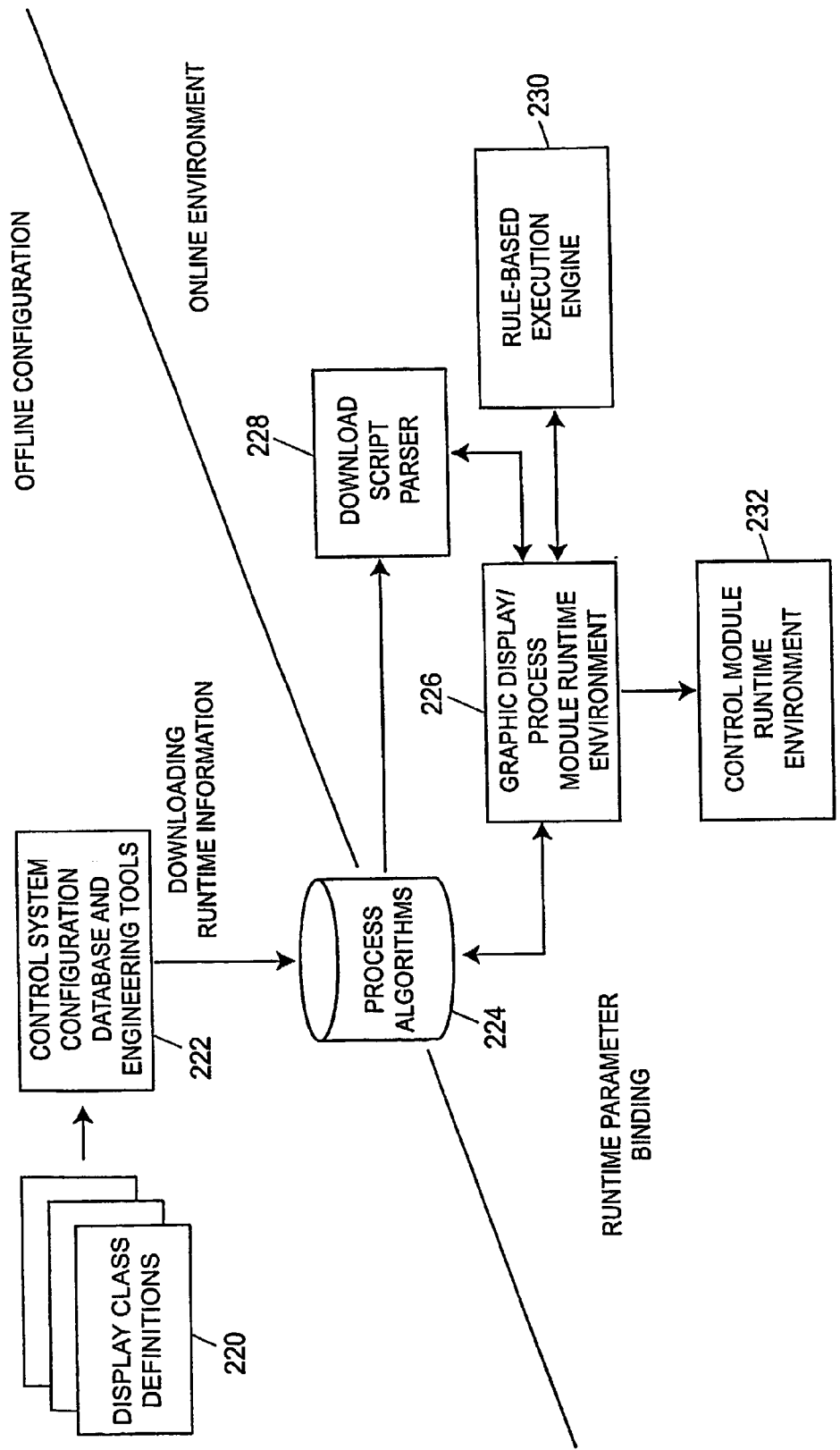
FIG. 5 is a logical block diagram of a manner in which process modules using smart process objects may be created in and implemented within an existing process control network.

FIG. 5 depicts one possible manner of integrating the execution engine 48 and the process modules and graphic displays used thereby within a process plant having a distributed control strategy. As illustrated in FIG. 5, the display class definitions 220 created by or associated with the process modules providing displays to an operator during execution by the execution engine 48 and are provided to the control configuration database and engineering tools 222 which may use and organize these display class definitions in any desired manner within the control strategy documentation. Process algorithms 224 may be connected to these display class definitions prior to runtime and then the display class definitions and flow algorithms bound thereto may be instantiated and provided to the graphic display/process module runtime environment 226 (which may be implemented in the form of one or more execution engines 48 in one or more workstations). The graphic display/process module runtime environment 226 uses a download script parser 228 to parse the code during execution (i.e., to perform just in time object code conversion) and uses a ruled-based execution engine 230 to execute flow algorithms or other rule based procedures provided for or bound to the display classes. During this process, the graphic display/process module runtime environment 226 may communicate with the control module runtime environment 232, which may be executed in controllers and field devices associated with the process, to provide data or information to the control module runtime environment 232 or to access data or other information from the control module runtime environment 232. Of course, the graphic display/process module runtime environment 226 may communicate with the control module runtime environment 232 using any desired or preconfigured communication networks, such as the Ethernet bus 24 of FIG. 1. Still further, other methods of integrating the graphic displays, process modules and control modules described herein into a standard process control system or process plant may be used as well.

As described above and shown in the exemplary process graphic display of FIG. 4, smart process objects have both graphical and simulation elements, and are used to depict and model the operation of a plant or a portion of the plant. In the following description, the graphical elements or aspects of the smart process objects are set forth in greater detail in connection with one or more embodiments. Generally speaking, and to first summarize the foregoing description, each smart process object represents a physical device or process plant element and includes a graphical element that may be used in a graphical depiction of that element, and a modeling or simulation element, such as an algorithm, that models or simulates the behavior of that process element when operating in the plant. In particular, a smart process object may include a display element to be displayed to the operator, data storage for storing data and information pertaining to and received from an associated entity within a plant, and methods that may be executed on the stored and received data to render the graphical depiction. Multiple smart process objects may be connected together to create a process graphic display that depicts the operation of a certain portion of the process plant. To that end, data from the actual plant (e.g., as measured within the plant) may also be communicated to and depicted within the process graphic display created using smart process objects. The content and information generated from this implementation may be presented via the process graphic displays, which may be generated by the execution engine, one or more separate rendering engines (e.g., a vector graphics rendering engine), or any other engine, application, or other software suitable for generating the graphics necessary to depict the content and information.

Before proceeding to describe further details regarding the smart process objects and the process graphic displays created therefrom, it should be noted that further information regarding smart process objects and process graphic displays and their use with process modules, may also be found in (i) U.S. patent application Ser. No. 10/278,469, entitled "Smart Process Modules and Objects in Process Plants," which was filed on Oct. 22, 2002, (ii) U.S. patent application Ser. No. 10/625,481, entitled "Integration of Graphic Display Elements, Process Modules and Control Modules in Process Plants," which was filed on Jul. 21, 2003, and (iii) U.S. patent application Ser. No. 11/014,307, entitled "Process Plant Simulation Using Smart Connection Elements," which was filed Dec. 16, 2004, the entire disclosures of which are hereby expressly incorporated by reference in their entirety herein. For instance, in U.S. patent application Ser. No. 11/014,307, reference is made to FIGS. 5-8 thereof and the corresponding textual subject matter set forth in paragraphs [0075] to [0107], where FIG. 5 thereof shows nested process graphic displays, FIG. 6 thereof shows an association of a process module associated with a process graphic display, FIGS. 7A and 7B thereof show the communication interconnections between, and the integration of, a process graphic display, a process module and a control module, and FIG. 8 thereof shows an interconnected process and control modules providing advanced control and simulation capabilities.

As described above, the configuration application enables the construction of one or more graphic displays that generally reflect areas or portions of the process plant. More specifically, each graphic display includes a number of process graphic elements tied to respective process module elements of a process module designed to simulate a portion of the process plant. Each process graphic element and process module element may be data linked via, for example, the process control system, to a corresponding process plant element, which may be, for instance, a measurement element (e.g., a transmitter), an actuator (e.g., a motor), or a processing element (e.g., a reactor). Once configured, the process graphic elements are designed to dynamically depict information and content related to the on-line operation of the process plant elements, such as process measurements and status indications, by interfacing with the control system. In addition, unmeasured parameters that reflect on-line process operation may be calculated using the process simulation parameters, algorithms, etc. provided in the process modules, or process module elements thereof, and may be shown as an integral part of the associated graphic displays. As further described above, the process simulation provided by the process modules may also be used in an off-line environment used for engineering or training simulation purposes.

In support of the above-described off-line and on-line functionality, each process graphic display may be configured to include a plurality of customized views, or layers, each of which may reflect content or information specifically directed to (i) the current runtime context (e.g., on-line operation or off-line simulated operation), and (ii) the current user viewing the graphic displays. Potential uses when the process plant is off-line include operator training, instruction, and any other simulation contexts. When the process plant is on-line, a variety of types of operators and maintenance and other personnel may view the process graphic displays to interface with the process plant. In each case, the process graphic display may include or exclude certain content or information to suit the perspective of the user. In this way, the same process graphic display—together with the entirety of configuration information contained therein—is advantageously utilized in a variety of user contexts, uses and activities, thereby avoiding the need for creation and configuration of separate displays for each different context, use or activity.

Generally speaking, each process graphic display, or process graphic element, is defined to include multiple different views of content and information. These views are generally arranged as multiple layers of content of a specific graphic display. The data, information and content displayed in the layers are generated, calculated and stored in connection with the respective smart process objects represented in the graphic display. As described further below, portions of the content shown via the graphic display may appear static across the various layers, while other content may be added or dropped as appropriate for the specific context or current user. The added content may be specific to a particular process plant element (e.g., an actuator), or may be generally associated with the entire process module, process graphic display, plant area being depicted thereby, or any portion or process plant element thereof. The added content may present any information suitable for the process plant elements depicted via the graphic display given the user currently logged into the workstation displaying the graphic display and given the context in which the process module is executing (e.g., off-line or on-line).

In one embodiment, the content shown via the process graphic display may be determined or specified automatically given a user profile of the current user of the workstation or other display device on which the process graphic display is depicted. The user profile may specify or indicate one or more characteristics (e.g., an identification code) that are relied upon to make the determination. To this end, the user profile may have fields dedicated to process graphic display authorization levels or privileges. Alternatively, the user profile may specify or indicate characteristics or other details generally (i.e., not specifically as part of the graphic display authorization process). Alternatively, or in addition, the user profile may specify a security or other clearance level that determines which process graphic information or view (or views) may be accessed by the user. In cases where users have access to multiple content views or layers, a specific layer may be accessed via selection of a tab as shown in FIG. 3 or via any one of a number of conventional graphical user interface selection mechanisms (e.g., drop-down menu command, etc.). The determination of which content layer to depict may be made by the execution engine 48 or the processor of any workstation or other device with access to the network, including, for instance, a rendering engine associated with a display device on which the process graphic display will be rendered. In this manner, the same display device (e.g., a handheld computer) may be utilized by different personnel that call for different content layers to be displayed.

FIGS. 6-15 are exemplary depictions of customized graphic display layers that may be rendered for display in accordance with user profile and/or run-time context, where elements common to multiple figures are identified with like reference numerals. The user profiles and contexts shown and described in connection with FIGS. 6-15 involve operation, maintenance, engineering, management, and instruction (i.e., training). However, it should be understood that these user profiles and contexts are only exemplary and general in nature. For a given process plant, different user profiles or contexts may be appropriate, thereby necessitating additions to, or reductions of, the foregoing list. It may also be useful to have multiple content layers in connection with any one of the above-identified categories, such that, for example, two different engineering groups of users have respective views of the graphic display customized and dedicated to the respective functions or responsibilities of the groups.

Figure 6:
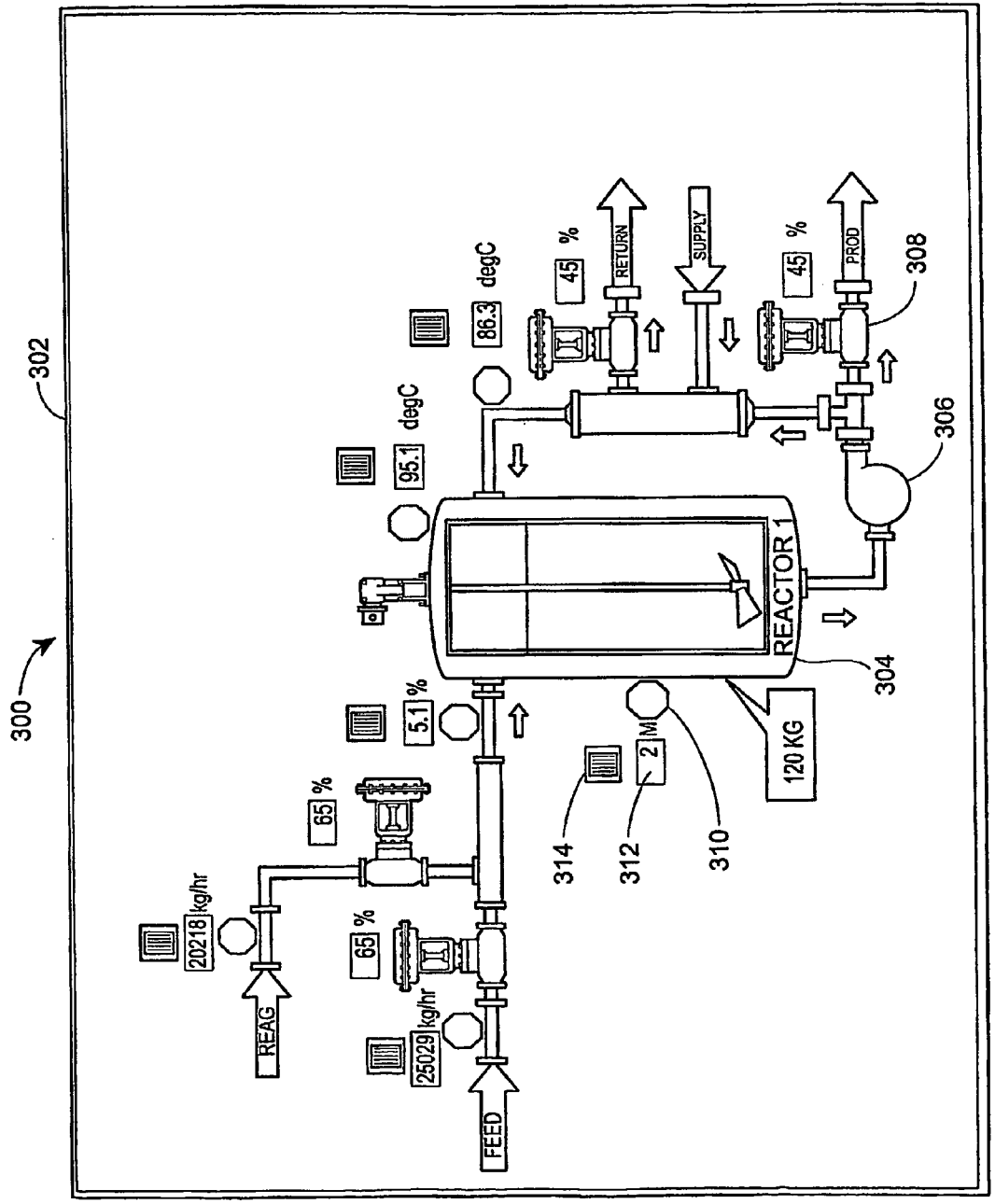
FIG. 6 is a simplified depiction of an exemplary operator content layer of a process graphic display having graphic display elements for a set of smart process objects.

With reference now to FIG. 6, an exemplary operations view, or operator layer, of a run-time process graphic display 300 is shown. The graphic display 300 is shown in a simplified form for ease in illustration only, and may be presented in conjunction with the conventional suite of tools made available in a windows, or graphical, user interface environment for navigation, etc., as well as other tools specific to the process graphic display context, such as one or more panels for viewing process parameters, or any other textual or other information regarding the process graphic display or any selected graphic display element thereof. More specifically, the graphic display 300 may include content or information presented via faceplates, panels, or other items that may be selected for temporary, dynamic or static presentation via various menu commands or, for instance, a right-click or any other graphical user interface actuation.

The operations view of the graphic display 300 may include a center panel 302 in which a group of process graphic display elements are disposed. Each of the graphic display elements may have both static and dynamic portions to depict the operation (or simulated operation) of the corresponding process plant elements being depicted. Such dynamic depictions may include three-dimensional views, animation, and continuous or periodic updates of data shown in a data panel dedicated to a particular process plant element. As described above, each graphic display element may be tied in one-to-one correspondence with a process module element of a process module, which, in turn, may be tied in one-to-one correspondence with an element of the process plant. For the exemplary process module represented by the graphic display 300, the graphic display elements include representations of a reactor 304, a pump 306 disposed in a line carrying output from the reactor 304, a valve 308 controlling flow downstream of the pump 306, and a level sensor transmitter 310 in communication with the fluid in the reactor 304. The process module (not shown) corresponding with the graphic display 300 accordingly includes process module elements that could be shown in much the same manner as the process module shown in FIG. 7A of the above-referenced applications.

An operations view, or operator layer, of the graphic display 300 generally includes data panels indicating current, on-line parameters or values for the process plant element(s) with which the data panel is associated. For example, the level sensor transmitter 310 has a data panel 312 having a dynamic data field showing that the current fluid level in the reactor 304 is 2 meters. The data panel 312 also specifies a unit (M) for the measurement, which may be static or dynamic. The data panel 312 may also include a detailed display button 314, the selection of which by the operator generally produces a faceplate (not shown) providing further information regarding the level sensor, the level sensor transmitter, or any other process plant instrumentation or equipment associated with the value or parameter being sensed.

As described above, the value, parameter or, more generally, content displayed via the data panel 312 may be indicative of the actual, on-line operation of the process plant or of simulated operation in the event of, for instance, a failed measurement element. More generally, the operator content layer shown in FIG. 6 may be configured to depict any specified amount of the simulation information generated via the smart process objects, as desired. For example, certain information related to simulated operation may not be suitable for operator viewing, but rather may be directed to maintenance personnel attempting to determine whether a valve (or any other field device) is operating properly. Such simulation information may never be made available via the operator layer, or alternatively may only be made available indirectly via, for example, an alarm indicating an undesirable deviation between actual and simulated values.

In another exemplary use of the operator layer, an operator in training may be viewing the graphic display 300 during a training exercise. In this case, the process graphic 300 may appear much the same, if not identically, to the manner in which it is displayed during on-line operation, thereby providing the operator in training an accurate representation of the actual workstation environment experienced by an operator of the process plant. However, in this training context, as well as other off-line contexts, the process graphic 300 may include an indication (not shown) signaling to the user that the process is off-line, and simulated operation is under way.

As described above, the graphics display shown in FIG. 6 represents a single, exemplary view of the process graphic display 300 rendered or produced from execution of the methods, etc. defined in the smart process objects for each of the graphic display elements depicted therein. As described above, one may consider the process graphics display shown in FIG. 6 as one content layer of the content and information generated in connection with the graphic display elements and smart process objects. The view or layer may only involve the depiction of a portion of the content and information generated, insofar as the layer is only one of several possible layers or views of the generated content or information.

Figure 7:
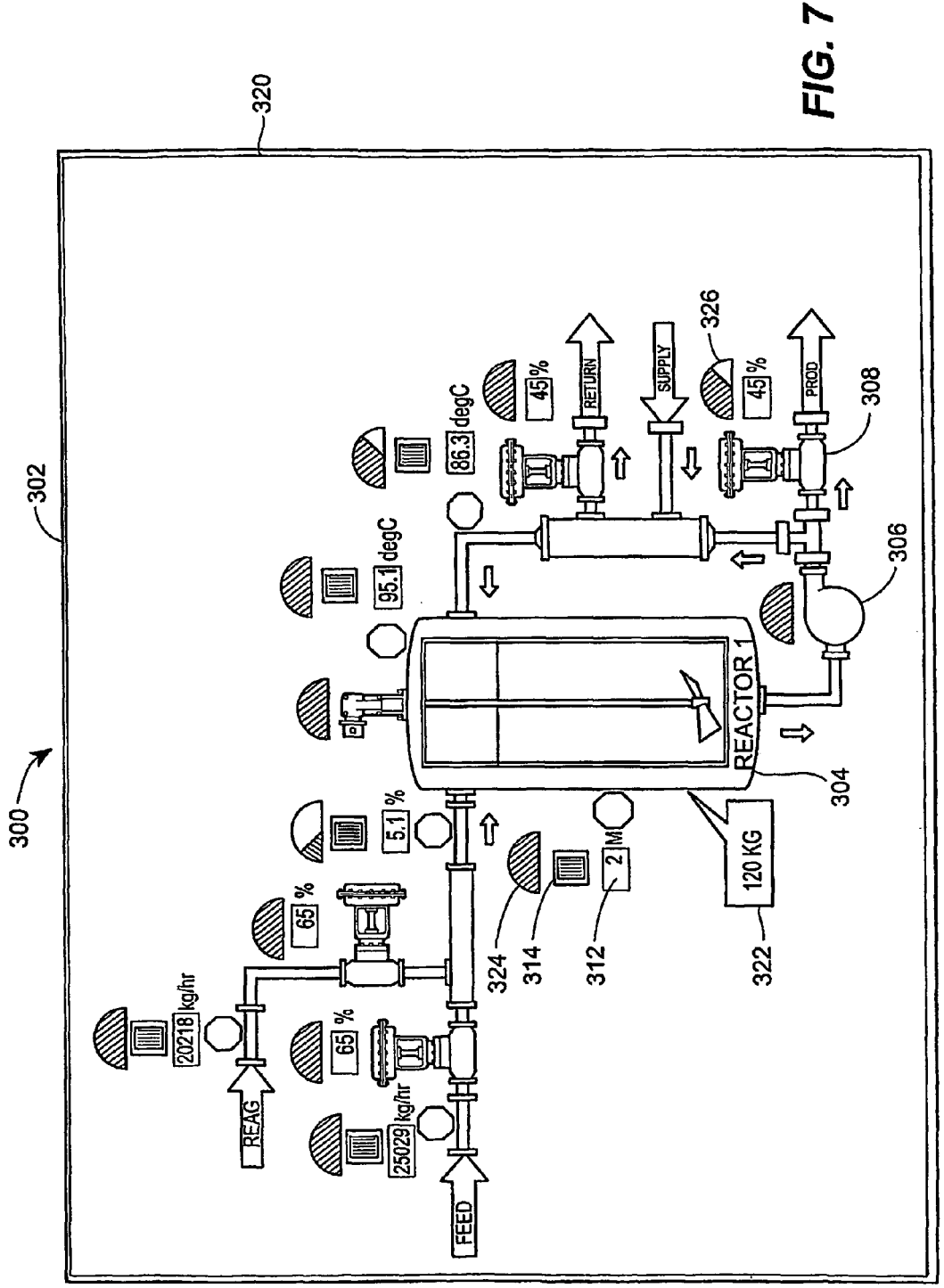
FIG. 7 is a simplified depiction of an exemplary maintenance content layer of the process graphic display of FIG. 6, the maintenance content layer presenting graphic display elements differing from those shown in the content layer of FIG. 6.

FIG. 7 shows another exemplary content layer 320 of the graphic display 300. In this example, the content layer 320 is directed to a maintenance context, which may be useful for another subset of users of the user interface, including outside service providers or plant personnel involved with maintenance of the process plant equipment and instrumentation. In some cases, the maintenance content layer may be available only when the process is on-line, inasmuch as information relevant to the maintenance context typically involves actual equipment operation. However, in some embodiments, maintenance personnel may have occasion to view information related to, or derived from, simulated operation of the process plant elements represented by the graphic display 300, particularly in an indirect manner as described below. More generally, the maintenance layer may present both actual (i.e., on-line) operation and simulation operation information to support comparisons and other analysis of actual operation and the simulation model of a process plant element. As a result, the maintenance content layer 320 may be made available in the run-time environment while the process is either on-line or off-line.

The maintenance content layer 320 or view may provide content or information incorporating data from a simulated operation of the process plant in either a direct or indirect manner. For instance, the content layer 320 may display simulation content directly via a faceplate (which may be generated via, for instance, a selection button). In such cases, the simulation content may be representative of unmeasured or non-measurable process parameters, such as a mixture composition. Alternatively, or in addition, the graphic display 300 may include graphic elements having information or content calculated via the simulation. Such simulation content may be continuously displayed in a panel 322 having a directed shape to denote association with the process graphic element, such as the reactor 304. On the other hand, measured parameters that may assist in the diagnosis of process plant equipment may be compared with values generated from the simulation. To this end, the maintenance view or layer 320 may display one or both of the actual and simulated parameter values.

In one embodiment, the comparison of actual and simulated parameter values may be displayed in the layer 320 via a health indication or indicator. As shown in FIG. 7, to support a user wishing to examine the health of measurements, actuators, or other equipment or instrumentation, a maintenance content layer includes a health indication 324 as a half-circle, or dome-shaped, graphical item having a shaded, or colored portion indicative of the health of the instrument or equipment depicted via the graphic display element. In this case, the health indication 324 is fully shaded, meaning that the level sensor transmitter 312 appears to be operating normally, or in good health. Another health indication 326 is partially shaded or filled to an extent indicative of the relative health of the valve 308 with which it is associated. In this case, the process module element associated with the valve 308 may have received or calculated data indicative of the actual, on-line operation of the valve 308, as well as data from a simulation algorithm or method executing either internal or external to the smart process object. A further method or algorithm included within the smart process object may then compare the operational and simulation data to arrive at a relative health level of about 60%. The health indication 326 of the process graphic element 308 is then accordingly shaded to an extent representative of the 60% level.

The manner in which the health of process instrumentation or equipment is depicted via the graphic display 300 may vary between embodiments, as desired. In fact, the graphic editor provided with the configuration application may provide a user with the opportunity or capability to design the shape and other details regarding the manner in which a health indication is displayed. For example, the graphic editor may be used to configure a graphic display element having a new graphic element that renders a numerical health indication displayed as a dynamic field of a data panel. The health information or related content may be displayed via a faceplate or any other desired graphical element. In some cases, the faceplate may provide a multi-dimensional health assessment-instead of a single value (e.g., 60%). More generally, the maintenance view or layer 320 may include or utilize any number of different health indicators across the various instrumentation and equipment being monitored, and is not in any way limited to the exemplary type or approach shown in FIG. 7.

In some embodiments, the health indications 324 and 326 may provide a link to an asset management routine or module, such as the Asset Management Solution (AMS) available from the Rosemount division of Emerson Process Management (www.rosemount.com). For instance, health indications and other content involving a comparison or calculation of actual operational and/or simulation data may be generated by the process module element (or process block), an abnormal situation prevention (ASP) block, or other fault detection element associated with the process plant element or device. The ASP block may be integrated with the process block or act independently thereof as part of an ASP environment executing during run-time. The functionality provided by the ASP block may generally involve statistical analysis and/or expert analysis to determine if a fault condition exists. Conventional multivariate statistical process control (MSPC) analysis or principal component analysis (PCA) may also or alternatively be utilized, and may be integrated and configured into the process control system as described in the commonly assigned international application concurrently filed herewith and also claiming priority to the U.S. provisional application referenced above and entitled "Integration Of Process Modules And Expert Systems In Process Plants," the entire disclosure of which is hereby incorporated by reference, including those portions thereof directed to the aforementioned subject matter regarding MSPC analysis, PCA analysis, or other expert or expert-related analysis (see, e.g., FIG. 13 thereof together with the textual subject matter associated therewith). Links to other information, content, applications, or solutions may also be provided to support the maintenance or other current function, as desired.

The health indications 324 and 326 are examples of process graphic elements, or aspects thereof, that, while always included with every instantiation of the process graphic element, are not always shown in the graphic display 300. In other words, when the process module, process graphic display, or graphic display element, is being created or configured, a user may select from a palette the graphic element for placement in a canvas section, or work area, depicting the process module being built. Selection and placement of the process graphic element creates a specific instance thereof for the process module being built, thereby duplicating all of the methods, algorithms, settings, features or other aspects that define it. After placement, the element may be further configured and connected within the process graphic display (and associated process module). But unlike prior systems, this instance of the process graphic element (and the process module and graphic display) in which it resides will be used in the user interfaces for operations, maintenance, and other contexts, and for a variety of users via the multiple layers or views discussed herein. In this way, the element is only created and configured once, despite the variety of uses and contexts. The current user or context will determine how the element will be displayed, and specifically whether certain content or information associated therewith (e.g., a health indication) will be displayed.

The health indications 324 and 326 are also examples of items or aspects of a process graphic element that are produced automatically when the respective view or content layer is determined for depiction. Maintenance and other personnel for which the maintenance content layer is made available therefore receive the health indication content whenever the graphic display is produced or rendered for their use. This automatic production of content via a customized display layer may be determined by the user profile of the current user logged into the workstation. However, in alternative embodiments producing multiple content layers for a specific user, the health indication and other customized content or information may be produced in the graphic display at the user's discretion via selection of a layer tab or other command or option (e.g., "Show Health Indications").

Figure 8:
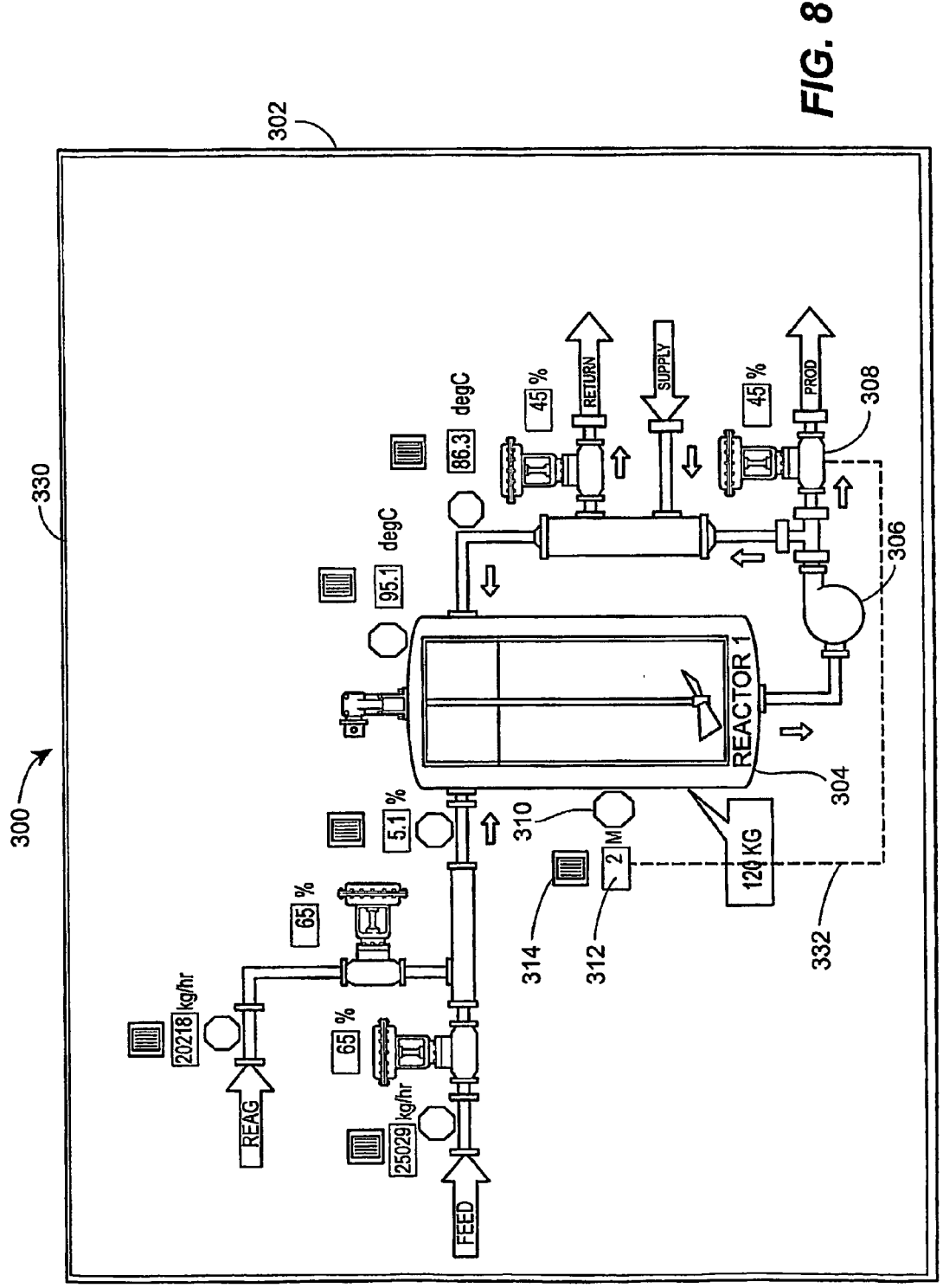
FIG. 8 is a simplified depiction of an exemplary engineering content layer of the process graphic display of FIG. 6, the engineering content layer presenting graphic display elements differing from those shown in the content layer of FIG. 6.

FIG. 8 shows another exemplary content layer of the graphic display 300, specifically a content layer 330 designed for engineering or other personnel having engineering access privileges. This engineering content layer 330 provides an example of how customized content or information may be generally added to the process graphic display. In contrast to the health indications 324 and 326 of the maintenance content layer 320, which are associated with a specific graphic display element, this layer of the graphic display 300 may add (or remove) content or information generally associated with the entire process graphic display. In this case, the engineering view or layer 330 includes a static line 332 connecting the dynamic field of the data panel 312 and the valve 308. More particularly, the static line 332 constitutes the content added at the graphic display level and rather than the element level. As with each of the other elements shown in the graphic display 300, the format or other presentation of the static line 332 may be varied as desired by the configuration engineer of the process graphic display using the graphic editor. In any case, the static line 332 may be used to designate a control connection or association between the value or parameter provided via the data panel and the operation of the valve 308. For instance, a control module specifying a control routine for the valve 308 may rely on an analog input (AI) parameter tied to the value presented in the data panel 312, which may be provided by a level transmitter for the tank 304, as described above.

In the exemplary embodiment shown in FIG. 8, the static line 332 may be useful for engineering personnel more familiar with the control routines executed in the control modules rather than the physical layout of the process plant equipment. The static line 332 conveniently identifies the equipment, instrumentation, measurements, and data involved in such control routines.

Other exemplary types of data that may be shown in an engineering content layer include or involve simulation information, such as estimated stream properties or properties of a unit, such as a calculated operating efficiency. The selection and placement of such content in the process graphic display may be accomplished using an estimated property element provided in a palette of pre-defined display elements in, for instance, a measurement category. Estimated property elements may be useful in, for instance, displaying a calculated pump discharge pressure. As noted above, the display of such estimated property elements is not limited to any one particular content layer, and may be specified and defined by the configuration engineer designing the process graphic display for use in any one or more content layers or views, as desired.

The content or information shown in the engineering content layer 330 may only be made available to users having engineering access privileges or, for example, an appropriate or sufficient security level or clearance. More generally, these and other characteristics of a user profile may be relied upon to determine whether a user has access to one or more of the customized views or content layer. To this end, the user profile may provide any one of a variety of indications of an access level, privilege or other clearance.

Figure 9:
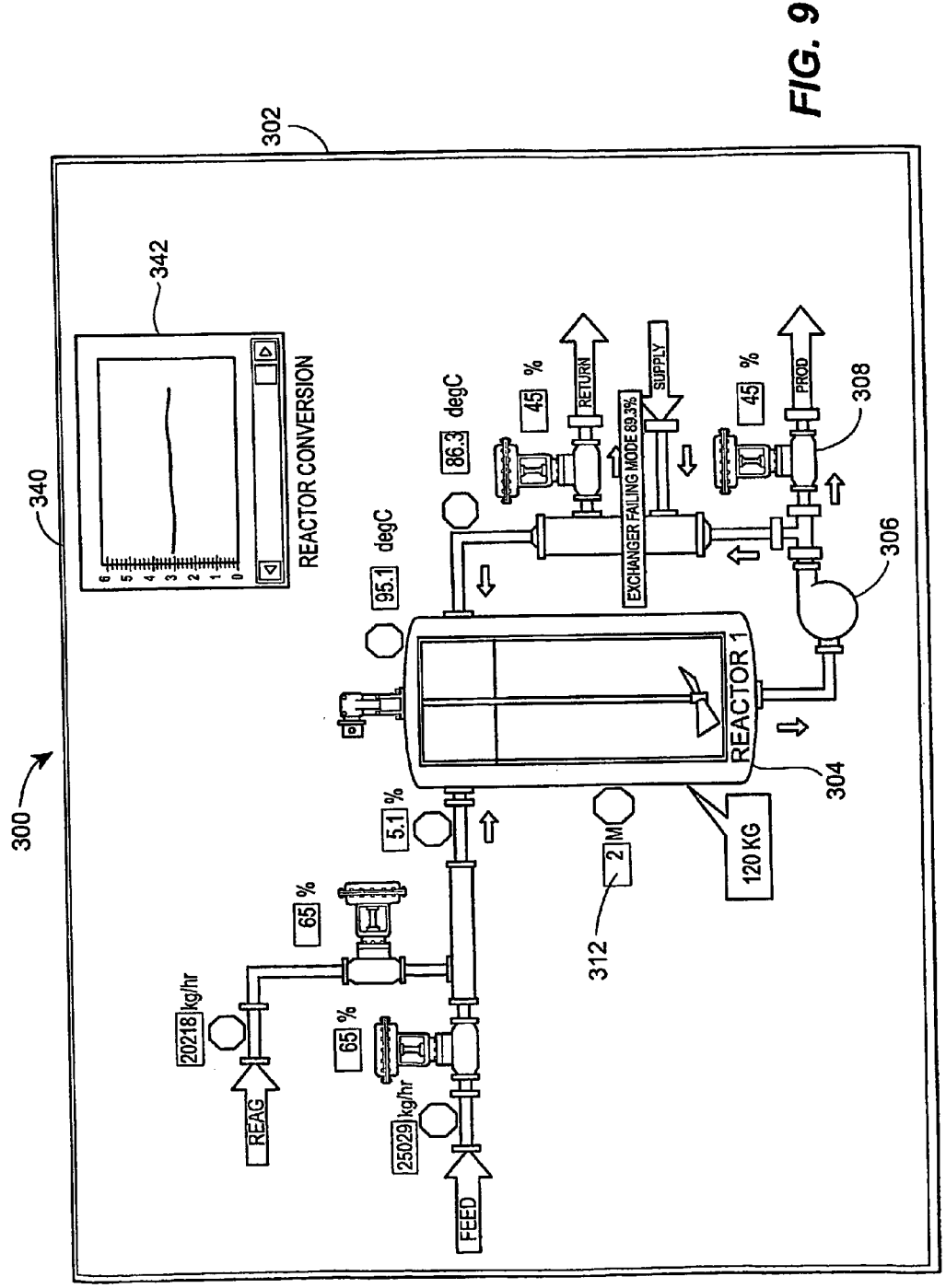
FIG. 9 is a simplified depiction of an exemplary management content layer of the process graphic display of FIG. 6, the management content layer presenting graphic display elements differing from those shown in the content layer of FIG. 6.

Another exemplary content layer for which access privileges or security clearance information in a user profile may be determinative of whether the content layer is displayed is a management content layer or view. An exemplary management view or content layer 340 is shown in FIG. 9. In a manner similar to that shown in connection with the engineering content layer 330, customized content or information may be added to the management view 340 at a display level to enable an evaluation of process performance generally. Alternatively, or in addition, content may be added at an element level. For example, a trend window 342 may be displayed to provide information and content related to reaction conversion. Another example shown in FIG. 9 includes a static description (e.g., "Exchanger Fouling Index") and a dynamic field for an indication of the degree to which the heat exchanger is fouled. Items such as these windows, fields, and other display elements may be included in the content layer of the process graphic display for personnel having a management user profile or, equivalently, management level privileges.

The management layer 340 shown in FIG. 9 also provides an example of a layer in which content or information may be excluded from view. In this case, the manager does not have operator or maintenance privileges and, as a result, the graphic display elements to launch operator- or maintenance-related faceplates are not shown. For instance, the detailed display button 314 of the maintenance content layer 302 shown in FIG. 7 is not provided. As a result, the faceplate made available via actuation of the button 314 is not made available to users limited to the exemplary management content layer 340. Similarly, the management content layer 340 does not include the health indications 324, 326 of the maintenance view. In some cases, the removal of content or information may be done for the purpose of simplifying the process graphic display, but any other purpose may be involved in the configuration decision. When simplification is the only issue underlying the customization, an option may be provided to the user of a content layer to display the content associated with other views or layers (via, e.g., a "Show All" command), provided, of course, the current user has the appropriate clearance or access privileges.

FIGS. 10-15 show various exemplary process graphic displays and graphic display elements for use in a training or instruction environment. Multiple content layers may be available or rendered for the different users involved in a training exercise. Specifically, one such content layer may be utilized by instructors and other personnel responsible for training future operators, while another content layer may be produced for the operators-in-training. In the past, the graphic displays utilized during such training episodes were often created independently from the actual operator displays, and were accordingly disassociated therefrom. Such disassociation brought about the possibility for inaccuracies or other discrepancies, thereby making the training process incomplete or misleading. The separate nature of the training displays also forced those configuring the user interface system(s) to generate more than graphic display, as described above.

Instead of having to create separate displays for both operators-in-training and their instructors, FIGS. 10-15 show how such personnel may be accommodated via customized content layers of the same process graphic display utilized in other contexts. In this example, an operator-in-training may be presented with a process graphic display view 350 that parallels the view presented to actual operations personnel. For instance, the two views may contain the same graphic display elements, namely a makeup valve 352, a recycle tank 354, a recycle valve 356, a reactor valve 358, a pump 360, and each of the respective connections. The training view 350 may only differ from the operations content layer in that specific data or detailed information presented via one of the hot buttons associated one of the aforementioned graphic display elements is indicative of simulated operation rather than on-line operation. Providing the operator-in-training with a simulation environment allows the training instructor, in turn, to modify parameters and other aspects of the process without having to shutdown or modify the actual on-line process or process plant elements.

Figure 11:
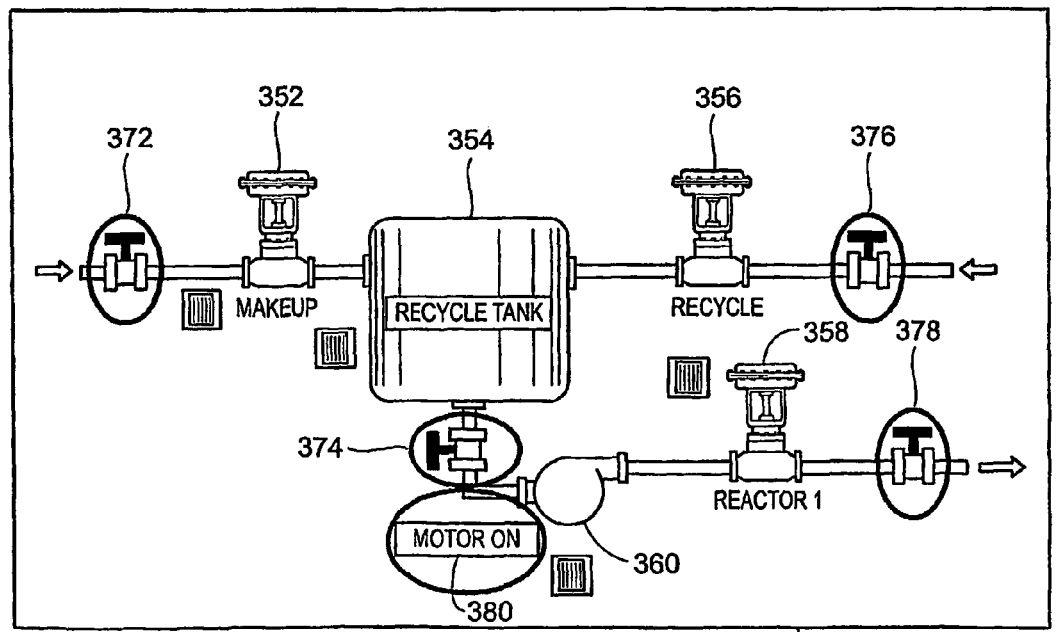
FIG. 11 is a simplified depiction of a training instructor content layer of the process graphic display of FIG. 10, the training instructor content layer presenting graphic display elements differing from those shown in the content layer of FIG. 10.

A training instructor view 370 corresponding with the operator-in-training view 350 is shown in FIG. 11. As with any of the content layers or views described herein, the configuration details for content underlying a view dedicated to a training instructor may be added via the configuration application 38 to the process graphic display. Generally speaking, the instructor view or layer 370 may provide the instructor with the ability to insert additional graphic display elements to the process graphic display. Such graphic display elements, once inserted, will then affect the simulated operation in a manner desired by the instructor. For example, the instructor or other personnel viewing the instructor content layer 370 will be capable of adding a manual, or hand, valve (or any other element) to simulate local hand valves that may exist in the plant (and therefore possibly introduce disturbances into the process) but are not represented or wired into the process control system. The instructor content layer 370 may also provide the capability of simulating other disturbances, such as those effected by local panel control changes or other local inputs to which the process would react. In this respect, the instructor layer may, but need not, be different from other layers that are fixed during runtime and, as such, do not present the flexibility to change or add graphical display elements (and the corresponding functionality) outside of the configuration environment.

Figure 10:
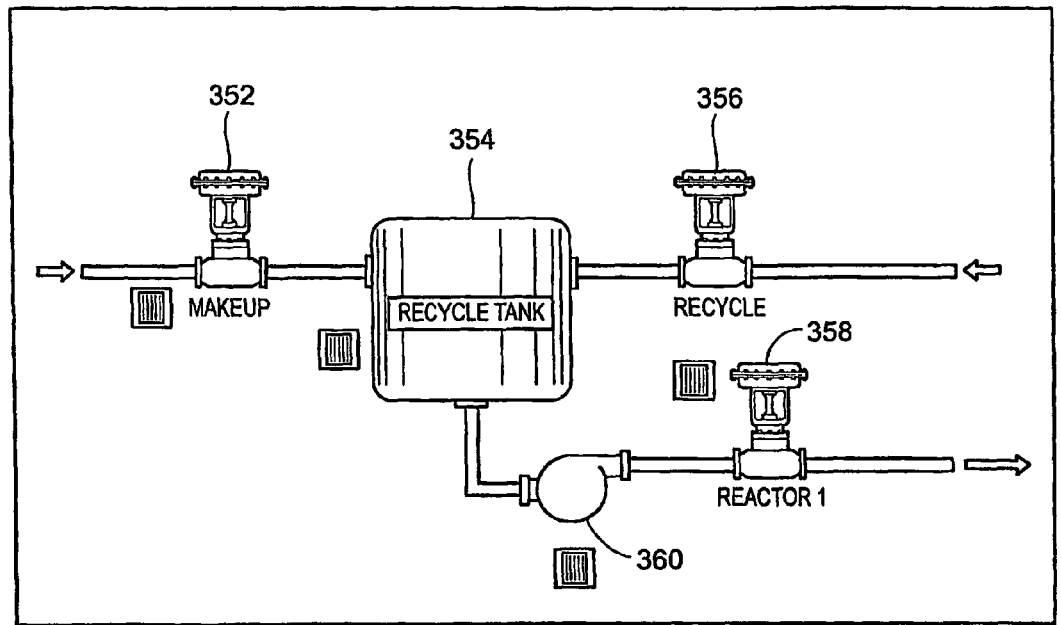
FIG. 10 is a simplified depiction of an exemplary training operator content layer of a further process graphic display to be utilized in a training exercise.

The exemplary instructor layer 370 of FIG. 11 includes several manual valves 372, 374, 376, 378, respectively disposed along connections between the non-connection elements of the process graphic display identified above in connection with FIG. 10 and otherwise shown in the operator content layer. In one embodiment, such manual valves may be automatically inserted upon the rendering of the instructor layer and, for instance, initially configured to have no effect on flow through the respective connections. The instructor or other user of the content layer 370 may then proceed to modify the parameters or other settings of one or more of the manual valves 372, 374, 376, 378 to introduce disturbances and otherwise affect and control the simulation. Similarly, the instructor content layer 370 may include a local panel graphic display element 380 to provide the instructor with the capability of specifying parameters made available at the equipment site in the process plant via, for example, a local panel. Alternatively, the graphics and functionality provided for the local panel may be defined via a custom graphic display element created using the configuration application 38 and configured for display in the instructor content layer 370. In either case, the process graphic display view seen by the operator being trained does not reveal the local panel or the sources of such disturbances, but nevertheless may reflect or indicate the effects thereof.

Figure 12:
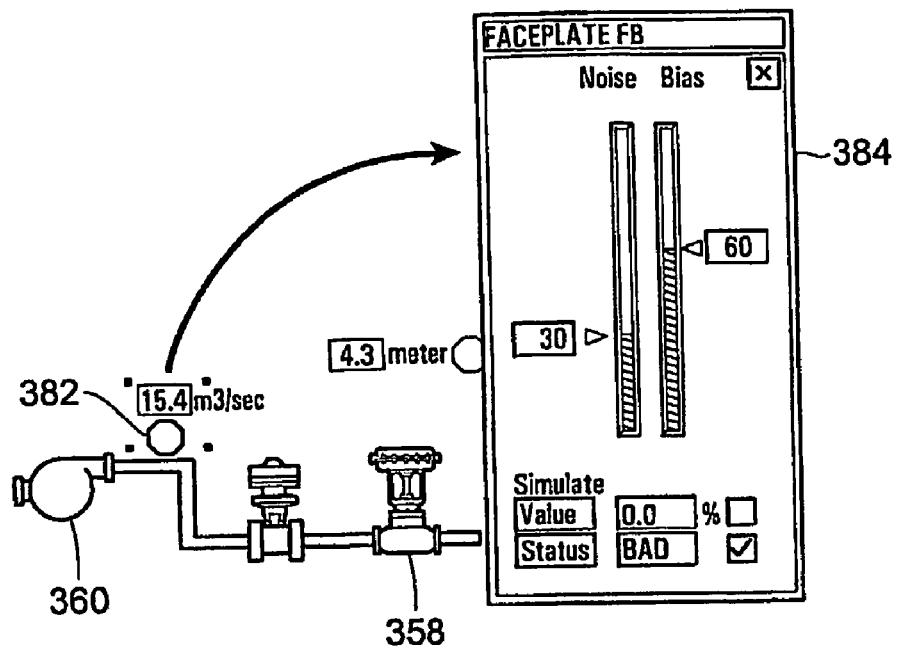
FIG. 12 is a further simplified depiction of the exemplary training instructor content layer of a process graphic display having a disturbance faceplate also to be utilized in a training exercise.

The introduction of simulated disturbances may be provided in connection with any of the graphic display elements, including, as described above, one of the manual valves 372, 374, 376, 378. More generally, if the instructor selects (e.g., clicks on or near) a graphic display element, such as a sensor or transmitter 382 on the outlet side of the pump 360, then a faceplate 384 may be provided as shown in FIG. 12. The faceplate 384 may provide any number of opportunities to adjust parameters, such as a noise level, a bias level or more general health indications (e.g., Status of "Bad"). Such parameters may, but need not, be actual parameters that can be manually or otherwise controlled (see, e.g., the noise level slider shown in FIG. 12). More typically, such parameters are designed to simulate problems with the equipment or instrumentation, thereby affecting the simulated operation in a realistic manner.

Figure 13:
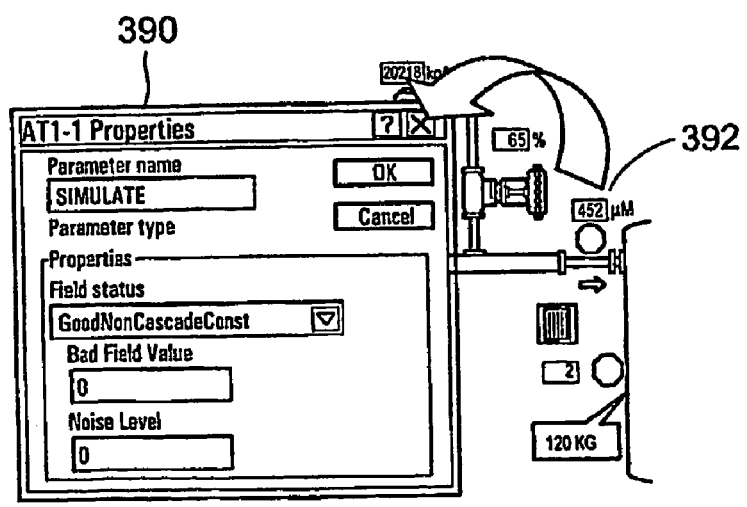
FIG. 13 is another simplified depiction of the exemplary training instructor content layer of a process graphic display having a dialog box or faceplate also to be utilized in a training exercise.

FIG. 13 shows an alternative display element in support of an instructor's introduction of simulated disturbances. Instead of a faceplate approach to specifying such information, a dialog box 390 is generated in response to the instructor's selection of a further transmitter 392, which may correspond with a flow sensor. The dialog box 390 may present the instructor with fields to specify various parameters or values including, for instance, a Field Status, a Bad Field Value, and a Noise Level.

Figure 14:
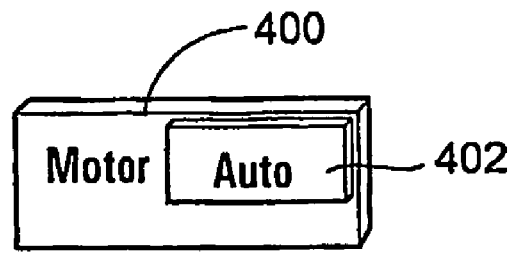
FIG. 14 is a depiction of an exemplary faceplate of a training instructor content layer of a process graphic display, the faceplate being generated in connection with an actuator element shown via the process graphic display; and, FIG. 15 is a depiction of a further exemplary faceplate of a training instructor content layer of a process graphic display, the further faceplate being generated in connection with a local input panel or other system external to the process control system for a process plant element simulated in a process module of which the process graphic display is representative.
Figure 15:
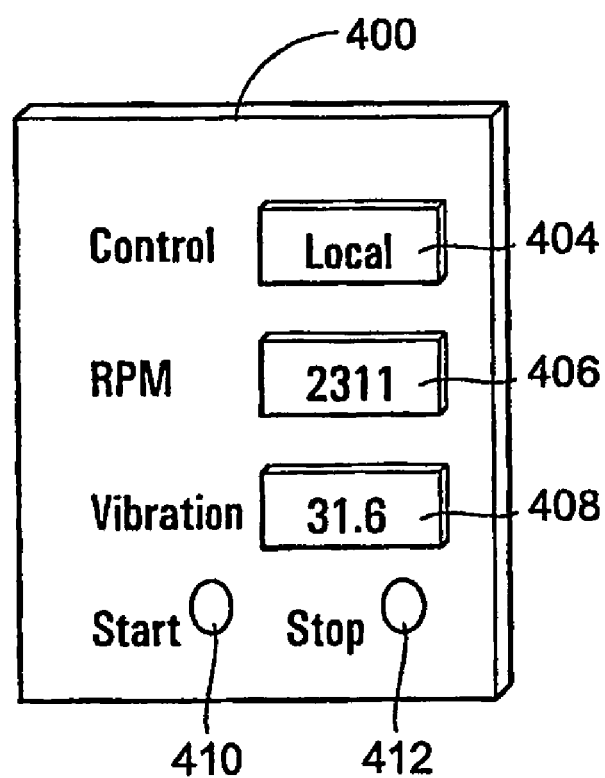

FIGS. 14 and 15 show exemplary local panel control elements of an instructor content layer in greater detail. Specifically, a local panel element 400 may be made available to allow the instructor to start, stop or otherwise control a motor, such as a pump motor. A selection button 402 or other item may be provided to facilitate the selection of one of such options thereby simulating the typical HOA function (i.e., the selection of hand, off, or auto options). Other actuator process plant elements may present a local panel element 402 having a number of parameters for designation, modification, etc., regardless of whether such parameters are, in fact, controllable at an actual local panel located at the actuator site. The local panel element 402, for instance, includes respective selection buttons for a control selection option 404, a speed selection 406, a vibration level 408, a "Start" selection, and a "Stop" selection 412.

As used herein, a process plant element may refer to a single field device or other plant component, or a set of any such plant components. For instance, a single component may be an actuator (e.g., valve), a processing element (e.g., a reactor), a measurement or instrumentation element (e.g., a sensor or transmitter), a connection element (e.g., pipe), a stream element, etc. A set of process plant components may, but need not, refer to any subset of process plant elements that are depicted in a process graphic display.

When implemented, any of the software described herein may be stored in any computer readable memory such as on a magnetic disk, a laser disk, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The invention claimed is:

1. A method of providing a user interface for a process plant, the method comprising the steps of:
    executing in a processor a process graphic display stored in a memory, the process graphic display (a) depicting on a display device process plant elements of the process plant, (b) operable to display on the display device each of a plurality of content layers, and (c) implementing one or more smart process objects, each of which smart process objects includes information for the plurality of content layers, wherein the information for the plurality of content layers of the process graphic display includes:
        (1) a set of graphic display elements common to each of the content layers, the set of graphic display elements illustrating a set of interconnected plant equipment to be illustrated in each of the plurality of content layers and
        (2) a set of information to be displayed in conjunction with the common set of graphic display elements for each of the different ones of the content layers, the set of information unique to the content layer;
    generating information for the plurality of content layers;
    determining a content layer of the plurality of content layers to display via the user interface; and,
    displaying via the user interface the determined content layer of the plurality of content layers,
    wherein each of the different ones of the content layers is customized for a different type of user.

2. The method of claim 1, wherein the generating step comprises processing runtime data received from the process plant in connection with the process plant elements.

3. The method of claim 2, wherein the determining step comprises selecting the determined content layer based on a user profile characteristic, wherein the user profile characteristic comprises an indication for operator access, and wherein the displaying step comprises rendering an operator content layer of the plurality of content layers based on the runtime data.

4. The method of claim 1, wherein the generating step comprises processing simulation data in connection with simulated operation of the process plant elements.

5. The method of claim 4, wherein the user profile characteristic comprises an indication for maintenance access, and wherein the displaying step comprises rendering a maintenance content layer of the plurality of content layers based on the simulation data.

6. The method of claim 4, further comprising introducing simulated disturbances into the simulated operation of the process plant elements.

7. The method of claim 6, wherein the user profile characteristic comprises an indication for training instructor access, and wherein the displaying step comprises rendering an instructor content layer of the plurality of content layers to support the introducing step.

8. The method of claim 1, wherein the generating step comprises implementing object methods defined in a plurality of objects respectively modeling the process plant elements depicted in the process graphic display.

9. The method of claim 8, wherein each object of the plurality of objects further defines a graphical depiction of the process plant element for each content layer of the plurality of content layers.

10. A user interface system for a process plant having a process plant element, the system comprising:
a computer-readable medium;
a display device;
an object comprising information stored in the computer-readable medium regarding operation of the process plant element; and,
an execution engine to utilize the object information in a runtime environment to generate content for a plurality of content layers of a process graphic display, wherein the object information includes:
(1) a set of graphic display elements common to each of the content layers, the set of graphic display elements illustrating a set of interconnected plant equipment to be illustrated in each of the plurality of content layers and
(2) a set of information to be displayed in conjunction with the common set of graphic display elements for each of the different ones of the content layers, the set of information unique to the content layer;
wherein the display device depicts a specified content layer of the plurality of content layers and wherein each of the different ones of the content layers is customized for a different type of user.

11. The user interface system of claim 10, wherein the object information relates to receiving runtime data from the process plant in connection with on-line operation of the process plant element.

12. The user interface system of claim 11, wherein the specified content layer is determined based on a user profile characteristic, and wherein the user profile characteristic comprises an indication for operator access such that the specified content layer is directed to a customized depiction of the runtime data in an operator content layer of the plurality of content layers.

13. The user interface system of claim 10, wherein the object information relates to generating simulation data in connection with simulated operation of the process plant element.

14. The user interface system of claim 13, wherein the specified content layer is determined based on a user profile characteristic, and wherein the user profile characteristic comprises an indication for maintenance access such that the specified content layer is directed to a customized depiction of the simulation data in a maintenance content layer of the plurality of content layers.

15. The user interface system of claim 13, wherein the object comprises further information related to a simulated disturbance of the simulated operation of the process plant element.

16. The user interface system of claim 15, wherein the specified content layer is determined based on a user profile characteristic, and wherein the user profile characteristic comprises an indication for training instructor access such that the specified content layer is directed to a customized depiction of the simulation data arising from the simulated disturbance in an instructor content layer of the plurality of content layers.

17. A method of providing a user interface for a process plant, the method comprising the steps of:
generating content for a plurality of different types of users of the user interface by processing data regarding on-line and simulated operation of the process plant;
executing a display module operable to render on a display device each of a plurality of customized depictions of the process plant; and
rendering a selected portion of the content in one of the plurality of customized depictions of the process plant by determining the selected portion of the content in accordance with a current user type of the plurality of different user types, wherein the selected portion of the content includes:
(1) a set of graphic display elements common to each of the plurality of customized depictions, the set of graphic display elements illustrating a set of interconnected plant equipment to be illustrated in the customized depiction for each of the plurality of different user types and
(2) a set of depiction-specific display information to be displayed in conjunction with the common set of graphic display elements for the current user type that differs for each of the plurality of different user types, the set of depiction-specific display information unique to the type,
wherein each graphic display element has associated with it the set of depiction-specific display information for each of the plurality of customized depictions.

18. The method of claim 17, wherein the rendering step comprises determining whether the process plant is on-line to further determine the selected portion of the content for the customized depiction.

19. A method of configuring a user interface for a process plant, the method comprising the steps of:
creating a process graphic display of a plurality of graphic display elements representative of a plurality of process plant elements of the process plant, respectively, the process graphic display operable to display on a display device each of a plurality of content layers for selectively displaying information related to on-line and simulated operation of the process plant elements;
configuring the plurality of graphic display elements by defining parameters related to on-line operation of the corresponding process plant elements and by defining simulation parameters to support simulated operation of the corresponding process plant elements; and, wherein each of the plurality of content layers is used to create a customized view of the process graphic display and includes:

(1) a set of graphic display elements common to each of the content layers, the set of graphic display elements illustrating a set of interconnected plant equipment to be illustrated in the content layer and (2) a set of information to be displayed in conjunction with the common set of graphic display elements for a particular content layer that differs for each of the plurality of content layers, the set of information unique to the content layer, wherein each of the graphic display elements has associated with it content layer information for each of the plurality of content layers and wherein the content layer unique display information for each of the plurality of content layers is customized for a different type of user.

20. The method of claim 19, further comprising the step of storing a plurality of objects for the plurality of graphic display elements, respectively, wherein each object includes the parameters related to on-line operation and the simulation parameters.

* * * * *

UNITED STATES PATENT AND TRADEMARK OFFICE
CERTIFICATE OF CORRECTION

PATENT NO. : 8,127,241 B2
APPLICATION NO. : 10/574824
DATED : February 28, 2012
INVENTOR(S) : Terrence L. Blevins et al.

It is certified that error appears in the above-identified patent and that said Letters Patent is hereby corrected as shown below:

In the Specification:

At Column 5, line 55, "may related" should be -- may be related --.

Signed and Sealed this
Sixteenth Day of July, 2013

Teresa Stanek Rea
*Acting Director of the United States Patent and Trademark Office*